United States Patent
Camargo et al.

(10) Patent No.: US 11,098,582 B1
(45) Date of Patent: Aug. 24, 2021

(54) DETERMINATION OF CALIBRATED MINIMUM HORIZONTAL STRESS MAGNITUDE USING FRACTURE CLOSURE PRESSURE AND MULTIPLE MECHANICAL EARTH MODEL REALIZATIONS

(71) Applicant: Saudi Arabian Oil Company, Dhahran (SA)

(72) Inventors: Otto E Meza Camargo, Dhahran (SA); Tariq Mahmood, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/792,742

(22) Filed: Feb. 17, 2020

(51) Int. Cl.
| | | |
|---|---|---|
| *E21B 49/00* | (2006.01) | |
| *E21B 43/26* | (2006.01) | |
| *G01V 99/00* | (2009.01) | |
| *E21B 41/00* | (2006.01) | |
| *E21B 47/002* | (2012.01) | |

(52) U.S. Cl.
CPC ........ *E21B 49/003* (2013.01); *E21B 41/0092* (2013.01); *E21B 43/26* (2013.01); *E21B 49/00* (2013.01); *E21B 49/008* (2013.01); *G01V 99/005* (2013.01); *E21B 47/002* (2020.05)

(58) Field of Classification Search
CPC ..... E21B 41/0092; E21B 49/00; E21B 49/006
See application file for complete search history.

(56) References Cited

U.S. PATENT DOCUMENTS

| | | |
|---|---|---|
| 6,705,398 B2 | 3/2004 | Weng |
| 7,042,802 B2 | 5/2006 | Sinha |
| 7,941,307 B2 | 5/2011 | Symington et al. |
| 8,024,124 B2 | 9/2011 | Sayers |
| 8,204,727 B2 * | 6/2012 | Dean ............... G01V 99/00 703/10 |

(Continued)

FOREIGN PATENT DOCUMENTS

WO   2015168417 A1   11/2015

OTHER PUBLICATIONS

Engelder, T., A Pore Pressure Limit in Overpressured South Texas Oil and Gas Fields, in R.C. Surdam, Seals, Traps, and the Petroleum System, AAPG Memoir 67, 1997, pp. 255-267, Chapter 15, American Association of Petroleum Geologists. Tulsa, OK.

(Continued)

*Primary Examiner* — Kenneth L Thompson
(74) *Attorney, Agent, or Firm* — Bracewell LLP; Constance G. Rhebergen; Brian H. Tompkins

(57) ABSTRACT

Earth models of stress conditions in subsurface reservoirs are formed reflecting rock mechanical properties, stress regime and also wellbore stability. A number of variables related to the rock mechanical properties and stress conditions are parameterized. The variability of minimum horizontal stress magnitudes as a product of the relative contributions of the various rock properties and input parameters or variables used to form the model is analyzed. Differences between predicted minimum horizontal stress magnitudes in the formation and an actual measurement obtained from the formation (for example, fracture closure pressure) are determined. The determined differences are the minimized through an optimization methodology to find a best set of parameters suitable to match the minimum horizontal stress to actual formation measurement.

20 Claims, 15 Drawing Sheets

(56) References Cited

U.S. PATENT DOCUMENTS

| | | | |
|---|---|---|---|
| 9,063,251 B2 | 6/2015 | Moos | |
| 9,110,190 B2 | 8/2015 | Yogeswaren | |
| 9,152,745 B2 | 10/2015 | Glinsky | |
| 9,305,121 B2 * | 4/2016 | Yao | G06F 30/20 |
| 9,465,140 B2 | 10/2016 | Crawford et al. | |
| 9,988,895 B2 | 6/2018 | Roussel et al. | |
| 10,724,346 B2 * | 7/2020 | Eftekhari Far | G01V 99/005 |
| 2009/0319243 A1 * | 12/2009 | Suarez-Rivera | G06T 17/05 |
| | | | 703/10 |
| 2012/0072188 A1 * | 3/2012 | Maerten | G01V 99/005 |
| | | | 703/2 |
| 2017/0205531 A1 | 7/2017 | Berard et al. | |
| 2021/0054736 A1 * | 2/2021 | Moos | E21B 43/12 |

OTHER PUBLICATIONS

Herwanger, J., Seismic Geornechanics, How to Build and Calibrate Geornechanical Models using 3D and 4D Seismic Data, 1 Edn., EAGE Publications b.v. Houten, 2011; Chapter 2, pp. 19-39, Chapter 6, pp. 102-118.

Koutsabeloulis, N., Numerical Geornechanics in Reservoir Engineering, Computer Methods and Advances in Geomechanics, A.A. Balkema, Rotterdam, The Netherlands, 1994.

Zoback, M., Reservoir Geomechanics, Cambridge University Press, UK, 2007/2010, pp. 19-21.

Camargo, Otto E. Meza et al.; "Reservoir Stress Path from 4D Coupled High Resolution Geomechanics Model: A Case Study for Jauf Formation, North Ghawar, Saudi Arabia" Saudi Aramco Journal of Technology, Fall 2016; pp. 45-59.

Fischer, K. et al.; "A workflow for building and calibrating 3-D geomechoanical models—a case study for a gas reservoir in the North German Basin" Solid Earth, 4, (2013); pp. 347-355.

International Search Report and Written Opinion for International Application No. PCT/US2021/018379 report dated May 28, 2021; pp. 1-16.

* cited by examiner

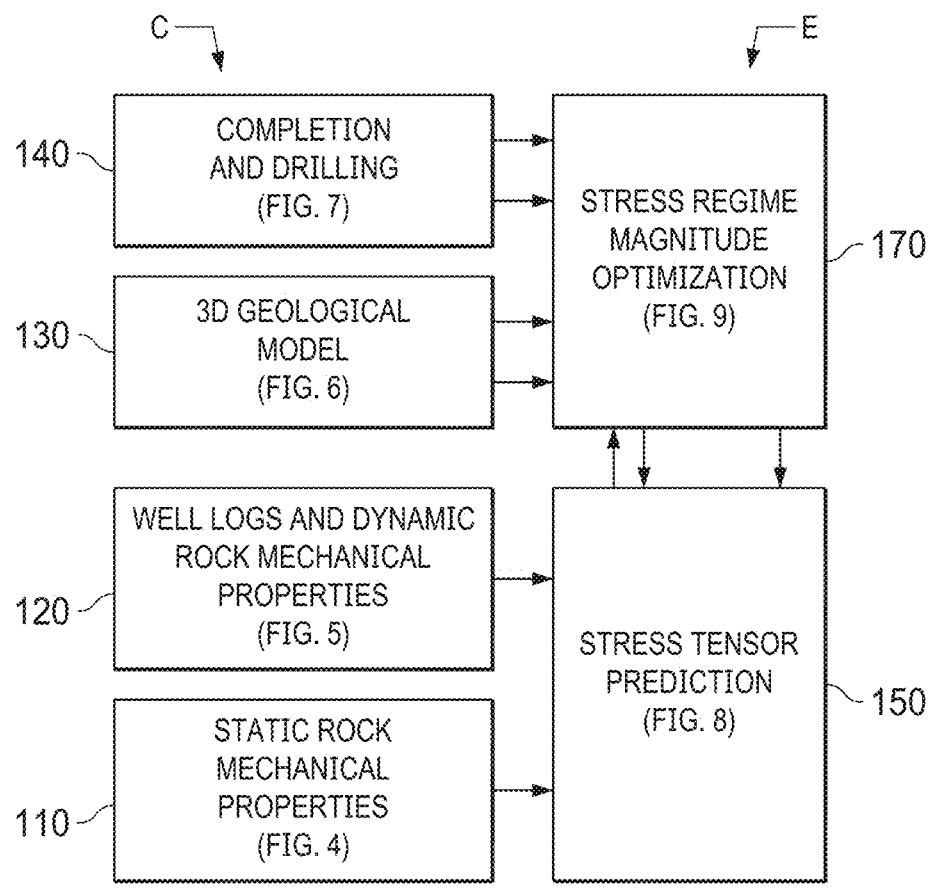
FIG. 3
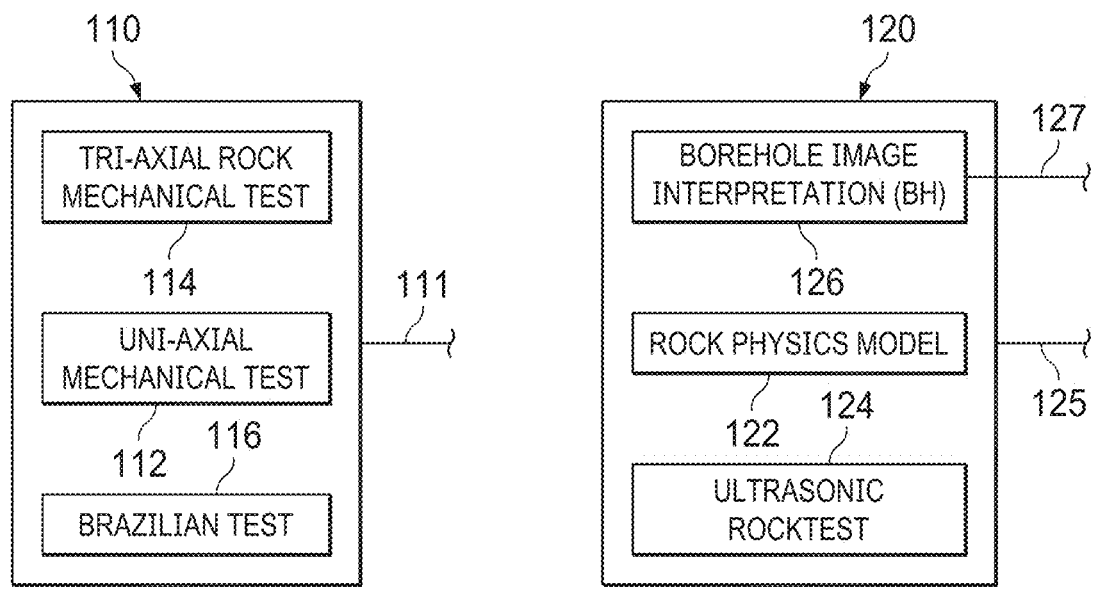
FIG. 4
FIG. 5

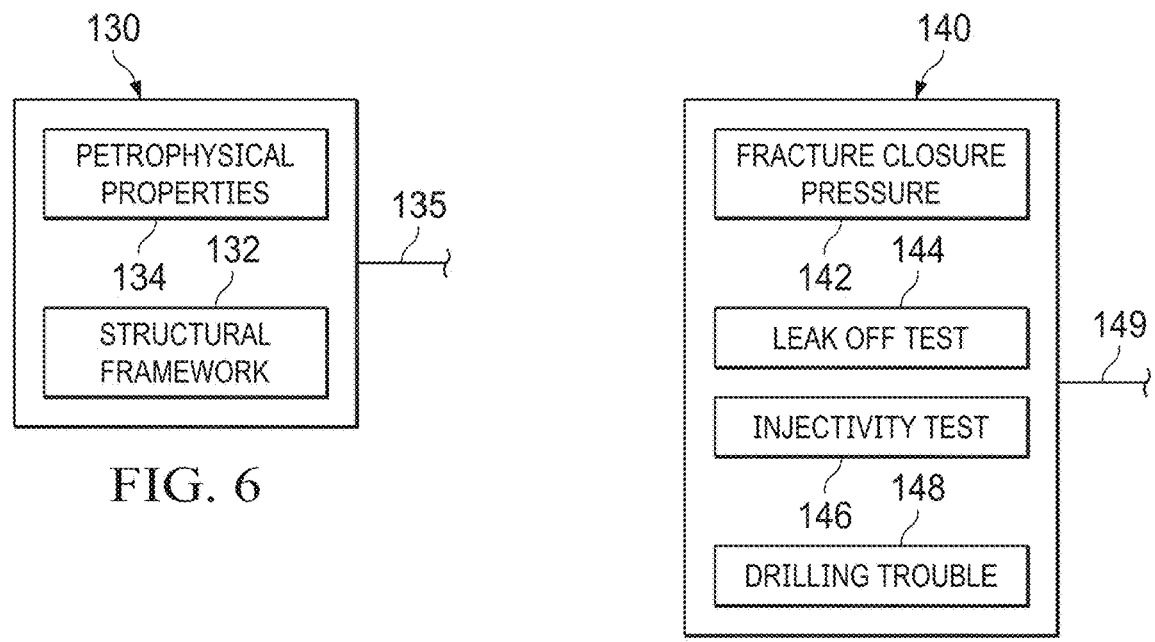
FIG. 6
FIG. 7
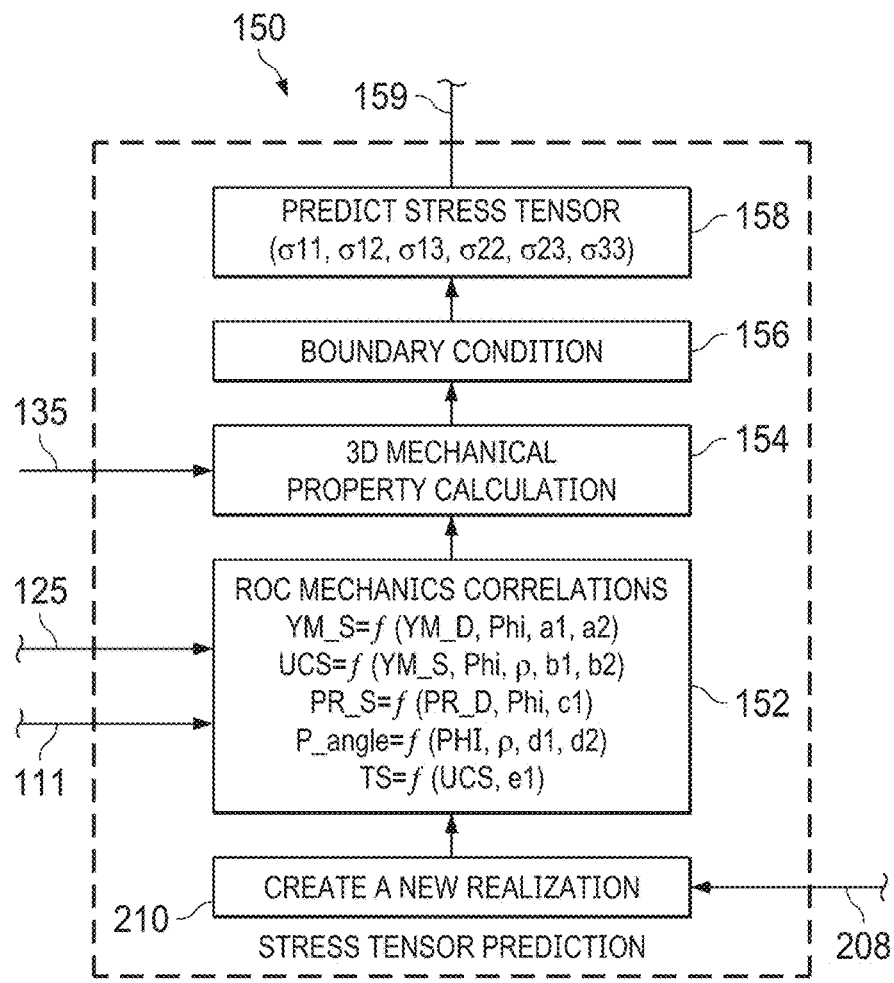
FIG. 8

DETERMINATION OF CALIBRATED MINIMUM HORIZONTAL STRESS MAGNITUDE USING FRACTURE CLOSURE PRESSURE AND MULTIPLE MECHANICAL EARTH MODEL REALIZATIONS

BACKGROUND OF THE INVENTION

1. Field of the Invention

The present invention relates to developing or forming accurate models of stress conditions subsurface reservoirs with calibrated minimum horizontal stress magnitudes in formations adjacent wellbores in subsurface reservoirs.

2. Description of the Related Art

Geomechanical models have been available to model estimated stress conditions near wellbores in subsurface formations. There have been a variety of techniques proposed. However, so far as is known, these models produced a particular estimate of stress conditions reflecting an assumed set of a number of postulated rock mechanical properties and stress regimes. The models so formed thus were in the form of a single solution of estimated stress conditions. If these modeling methods were furnished a modified or adjusted set of estimated mechanical properties and stress regimes, a different solution of estimated stress conditions would result.

Reservoir engineers were thus confronted with multiple models of stress conditions. Each of these models represented a possible indication of stress conditions of interest. The accuracy of the stress conditions indicated in the model was dependent on the accuracy of the estimates of rock mechanical properties and stress regimes provided as input data. So far as is known, there was no way to confirm a particular estimate of rock mechanical properties and stress regime in a subsurface formation was more reliable or accurate than other such estimates.

SUMMARY OF THE INVENTION

Briefly, the present invention provides a new and improved method of obtaining a calibrated measure of minimum horizontal stress magnitude in a subsurface geological structure at a location of a well in a subsurface hydrocarbon reservoir adjacent a well borehole wall in the subsurface structure. The present invention is performed for characterizing the nature of the reservoir in a three dimensional grid cell model of the reservoir as suitable for hydrocarbon production. The present invention is performed for characterizing the nature of the reservoir as suitable for fracturing to produce hydrocarbon fluids from the subsurface geological structure.

According to the present invention, reservoir parameters representing properties of the subsurface reservoir are obtained for processing in a data processing system. A plurality of different sets of estimated measures of tensor stresses in the grid cells of the grid cell model of the subsurface geological structure are formed based on properties of the subsurface reservoir represented by the obtained reservoir parameters.

Well operations are then conducted in the well to obtain measures of fracture closing pressure adjacent the borehole wall in the grid cells of the grid cell model. An error function composed of a set of error measures is then formed indicating differences of the plurality of different sets of estimated measures of tensor stresses in the grid cells from the obtained measures of fracture closing pressure adjacent the borehole wall in the grid cells of the grid cell model. An optimization of the formed error function is performed until the formed error function is at an acceptable level of accuracy.

BRIEF DESCRIPTION OF THE DRAWINGS

FIG. 3 is a more detailed schematic diagram of workflow for determination of calibrated minimum horizontal stress magnitude using fracture closure pressure and multiple mechanical earth model realizations according to the present invention.

FIG. 4 is a schematic diagram of workflow of a component portion of the workflow of FIG. 3.

FIG. 5 is a schematic diagram of workflow of a component portion of the workflow of FIG. 3.

FIG. 6 is a schematic diagram of workflow of a component portion of the workflow of FIG. 3.

FIG. 7 is a schematic diagram of workflow of a component portion of the workflow of FIG. 3.

FIG. 8 is a schematic diagram of workflow of a component portion of the workflow of FIG. 3.

DETAILED DESCRIPTION OF THE PREFERRED EMBODIMENTS

Figure 1:
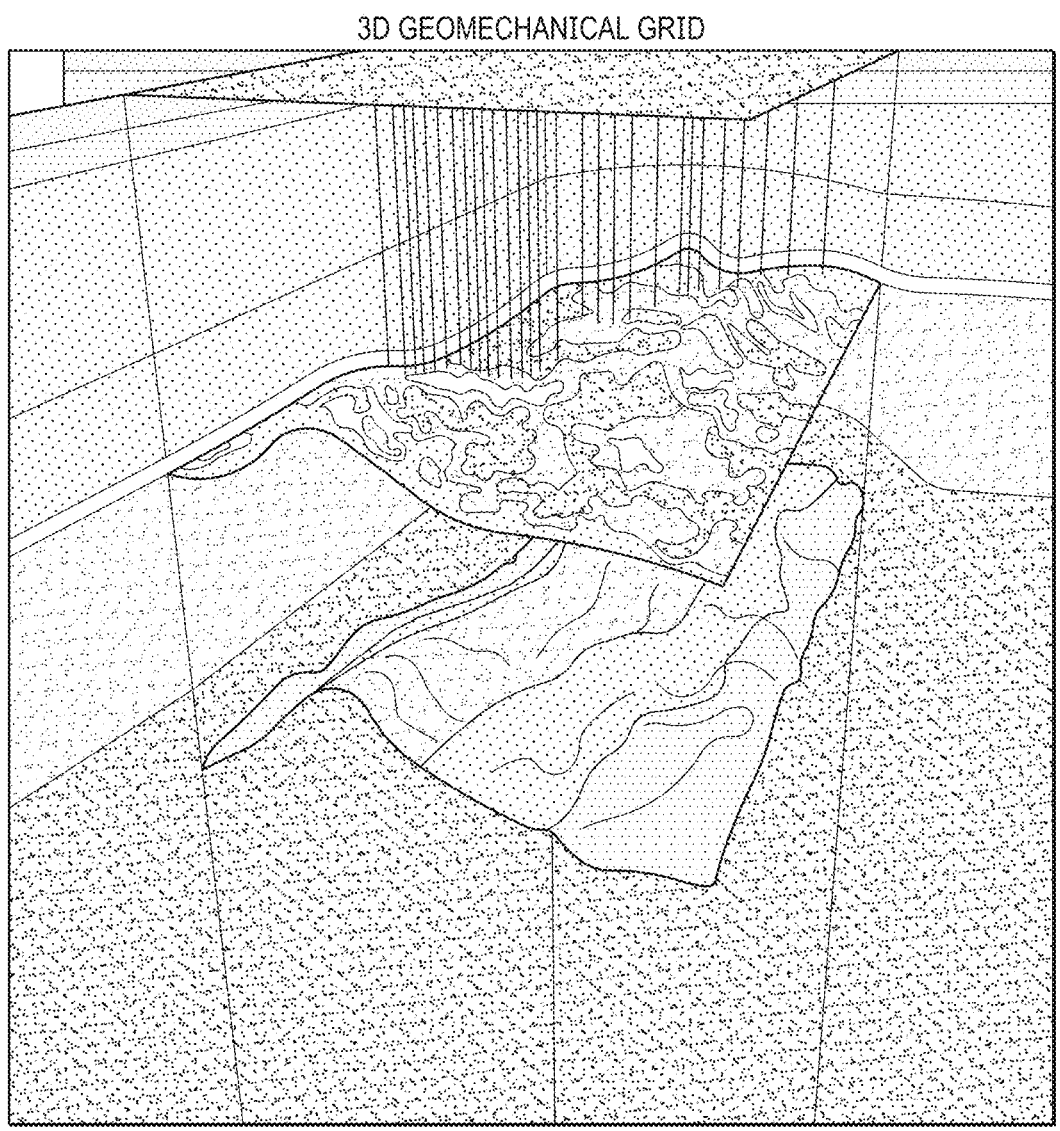
FIG. 1 is an isometric view of a computerized 3-dimensional geomechanical grid model of subsurface rock formations in a region of interest for hydrocarbon production according to the present invention.

In the drawings, a computerized 3-dimensional geomechanical grid model M is shown in FIG. 1. The geomechanical grid model M is a computerized 3-dimensional grid cell model of subsurface rock formations in a region of interest for hydrocarbon production. The computerized geomechanical grid model M includes input data indicating relevant mechanical properties and boundary conditions of the subsurface region of interest. The subsurface region of interest is one being analyzed for further production from a hydrocarbon reservoir, or for other well operations such as fracturing. The geomechanical grid model M and its data contents are one component of a workflow W (FIG. 2) according to the present invention.

Figure 2:
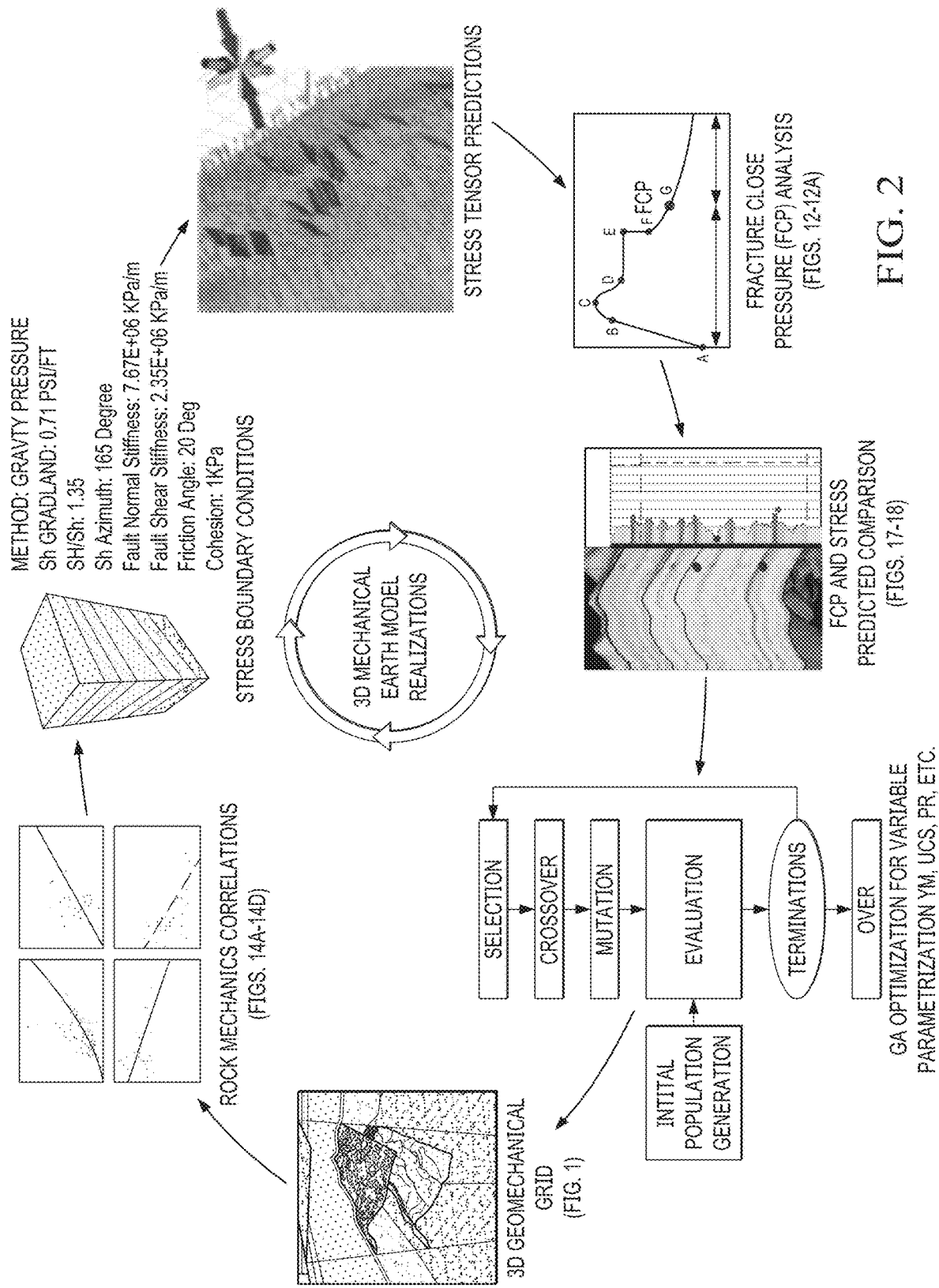
FIG. 2 is a schematic diagram of a workflow for determining an optimum set of measures of formation rock parameters for determination of calibrated minimum horizontal stress magnitude using fracture closure pressure and multiple mechanical earth model realizations according to the present invention.

FIG. 2 illustrates schematically the workflow W for determination of calibrated minimum horizontal stress magnitude at a location of a well adjacent a well borehole wall in the subsurface structure. The workflow is performed for characterizing the nature of the reservoir in a three dimensional grid cell model of the reservoir as suitable for hydrocarbon production. The workflow is performed using fracture closure pressure and multiple mechanical earth model realizations.

As will be described, the present invention builds a representative number of several finite element formation rock geomechanics simulations, to predict a minimum stress constrained by fracture closure pressure data. Fracture closure pressure data can be acquired and interpreted from hydraulic fracturing. An error function is quantified representing the difference between fracture closure pressure and minimum stress magnitude simulated from rock geomechanical measures, parametrizing the variability in the most relevant variables and minimizing the error by using a suitable minimization processing methodology.

The workflow W according to the present invention is based on rock mechanical modeling. The workflow W includes obtaining rock mechanical correlations as indicated at 30 (FIG. 1); determining stress boundary conditions as indicated at 40 (FIG. 1); forming estimated or predicted stress tensors in the subsurface formation of interest, as indicated at 50 (FIG. 1); analyzing fracture closure pressure analysis as indicated at 60 (FIG. 1); determining differences between fracture closures and estimated stress tensors as indicated at 70; and optimization processing as indicated at 80. With the present invention, the determined minimum stress magnitudes are constrained by the fracture closure pressure interpreted from direct measurement of well conditions.

Geomechanical modeling has important role in petroleum field development planning. Field development decisions are improved by an accurate assessment of well design options. Well design is closely related to existing geological conditions and reservoir engineering data using geomechanics technology. Minimizing costs and risks of drilling and achieving a maximum production rate in tight shale formations are technically and economically challenging. Geomechanical modeling behavior of a reservoir involves the interrelation of rock elastic and strength properties as well as in-situ stresses. The geomechanical properties of a reservoir and rock overburden is important to predictability and control of operation induced stress near a well, with consequent impact in well placement and completion strategy. Understanding the geomechanical conditions further away from the wellbore can also enhance results in the stages of a reservoir life cycle, from assessing potential drilling risks in the first wells to helping maximize recovery from mature assets.

Mechanical earth modeling require an ability to model the rock mechanical properties, stress regime and wellbore stability by parametrizing the formation geomechanical parameters or properties involved in the model. As will be described, the present invention obtains measures of the variability of the formation stress regime as affected by a selected number of different sets of the formation geomechanical parameters. Processing according to the present invention develops expressions for physical relationships of various rock mechanical properties, modeling what are known as "in situ" stress conditions, and quantifying as an error function representing as errors the differences between the minimum horizontal stress predicted and actual well measurements (fracture closure pressure) from well testing. The present invention minimizes the error or difference through error minimization processing to provide an optimum set of formation geomechanical parameters resulting in a minimized quantified error function.

In-situ stress is the natural, local stress within a rock mass formation. In-situ stress represents the quantity and direction of compression applied to a rock at a specific location mass formation. The "In situ" stress regime calculations used in this workflow are based on poro-elasticity relations using a finite element geomechanics numerical simulator. With the present invention, an accurate geomechanical mechanical property model is formed of a subsurface region of interest for production and development of hydrocarbons based on rock elastic properties, rock strength properties, fluid pressure and extensive reservoir characterization such as structural framework and petrophysical properties.

Methodology

The present invention provides a methodology to determination of calibrated minimum horizontal stress magnitude at a location of a well adjacent a well borehole wall in the subsurface structure for characterizing the nature of the reservoir. As shown schematically in FIG. 3, the methodology of the workflow W is organized into two components or stages: a Data Input and Conditioning Stage or Component C and a Processing Stage or Component P.

Data and Input Conditioning Stage C

The Data and Input Conditioning Stage C receives input measurements from laboratory tests, well logs, well measurements and performance data for present invention. The received input measures are processed and provided to the Processing Stage or Component P, as will be described. The measurements received by the Data and Input Conditioning Stage C are of four types or categories, which are: static rock mechanical properties, as indicated by a Static Rock Mechanical Properties Module 110 (FIG. 4); well log and dynamic properties, as indicated by a Dynamic Rock Mechanical Properties Module 120 (FIG. 5); the 3-D Geological model data and grid structure from the model M as indicated at 130 (FIG. 6); and completion and drilling data as indicated by a Completion and Drilling Module 140 (FIG. 7).

Static Rock Mechanical Properties 110

The static rock mechanical properties are quantified through static rock mechanical properties testing of rock samples and the obtained measures of such properties are stored in data processing system D. The stored rock properties from rock mechanical properties testing are provided by Static Rock Mechanical Properties Module 110 as indicated schematically at 111 for stress tensor prediction by a Stress Tensor Prediction Module 150 of Processing Stage P. The testing of rock sample is performed using core plugs with precise dimensions and conditions. Preferably used core-plug tests include uniaxial core testing data 112 to determine rock stress-strain relations as functions of formation rock as functions of applied tensile or compressive loads. Another core-plug test is a single/multi-stage tri-axial rock mechanical test 114 to provide data representing measures rock strength and mechanical conditions to simulate in-situ stress conditions providing compressive strength and static values of elastic constants of the rock. A further test is what is known as a Brazilian test 116 to determine tensile strength of rock samples under time increasing loads applied to opposite sides of the rock being tested. The static rock mechanical properties acquired and quantified by Static Rock Mechanical Properties Module 110 are described in subsequent paragraphs.

Figure 10:
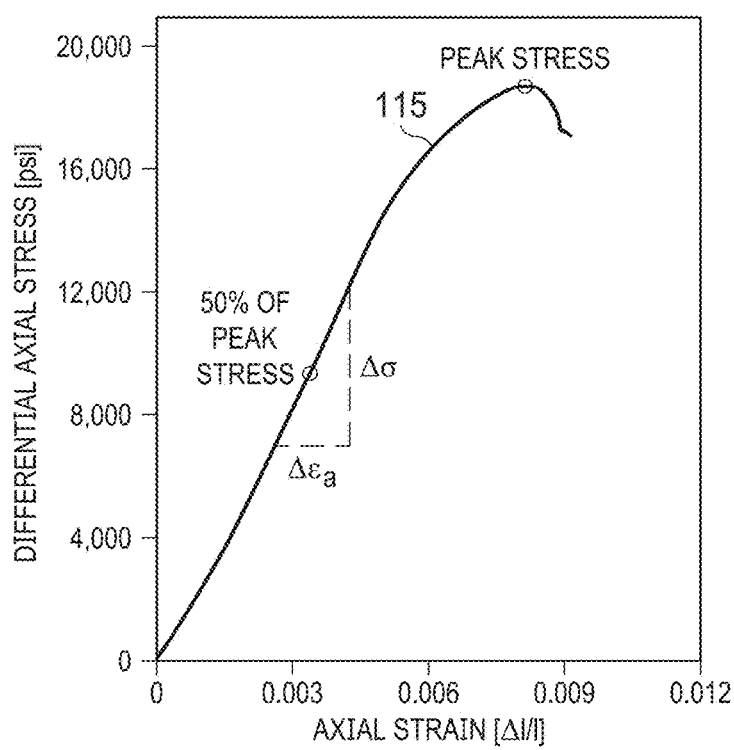
FIG. 10 is an example plot of strain measures illustrating the determination of static Young's modulus.

Static Young's Modulus. ($YM_S$), is a measure of the stiffness of the material and defines the relationship between the axial stress and the corresponding sample deformation (axial strain). Graphically, as shown Static Young's Modulus it is the slop $$\frac{\Delta\sigma}{\Delta\varepsilon a}$$

of a specific portion (50% peak stress) of a stress-strain curve 115 of stress-strain ratio E (FIG. 10). The elastic modulus E of a rock sample is based on stress and strain measurements and is calculated according to the following formula:

$$E = \frac{\text{axial stress}}{\text{axial strain}} = \frac{\Delta\sigma}{\Delta\varepsilon a}$$

Typical values for Static Young's Modulus in both megapounds per square inch (MPsi) and Gigapascals (GPa) are contained in Table 1 as follows:

TABLE 1

| Rock Type | Mpsi | GPa |
| --- | --- | --- |
| Granite, Westerly | 8.1 | 55.85 |
| Quartzite, Cheshire | 11.4 | 78.60 |
| Diabase, Frederick | 14.4 | 99.28 |
| Marble, Tennessee | 6.9 | 47.57 |
| Granite, Charcoal | 6.4 | 44.13 |
| Shale, Witwatersrand | 9.8 | 67.57 |
| Granite, Aplite (chert) | 12.0 | 82.74 |
| Quartzite, Witwatersrand | 11.3 | 77.91 |
| Dolerite, Karroo | 12.2 | 84.12 |
| Marble, Wombeyan | 9.4 | 64.81 |

TABLE 1-continued

| Rock Type | Mpsi | GPa |
| --- | --- | --- |
| Sandstone, Gosford | 1.4 | 9.65 |
| Limestone, Solenhofen | 7.7 | 53.09 |

Figure 11A:
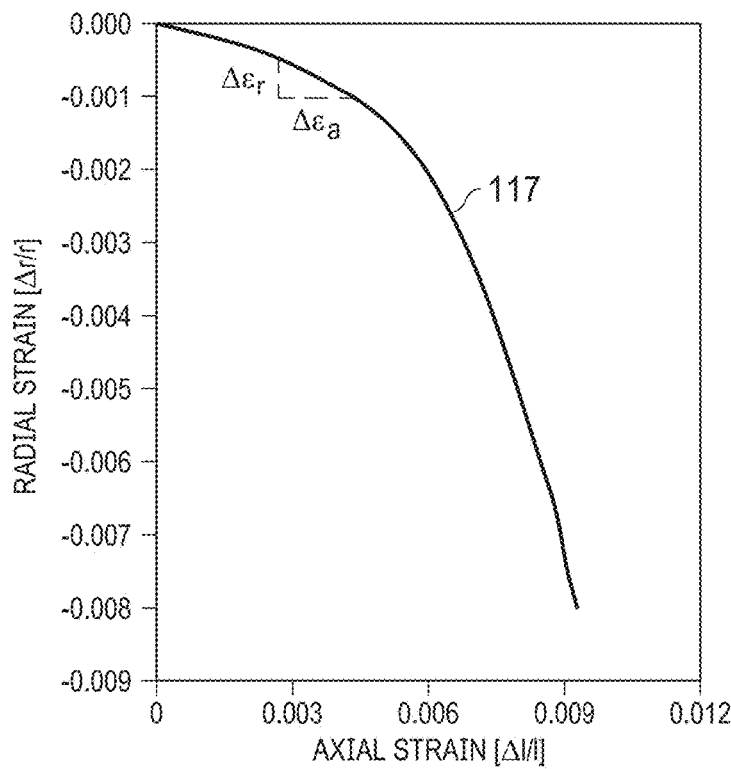
FIG. 11A is an example plot of strain measures illustrating the determination of static Poisson's ratio.

Poisson's ratio. ($PR_S$), v, is the negative of the ratio of transverse strain to the axial strain in an elastic material subjected to a uniaxial stress and defines the tendency of a material to expand or shrink in a direction perpendicular to the loading direction. Graphically, it is the slope $$\frac{\varepsilon_r}{\varepsilon a}$$

of a specific portion of a radial strain—axial strain curve 117 (FIG. 11A). Poisson's ratio is calculated with the following formula:

$$v = \frac{\text{radial strain}}{\text{axial strain}} = \frac{\varepsilon_r}{\varepsilon a}$$

Figure 11B:
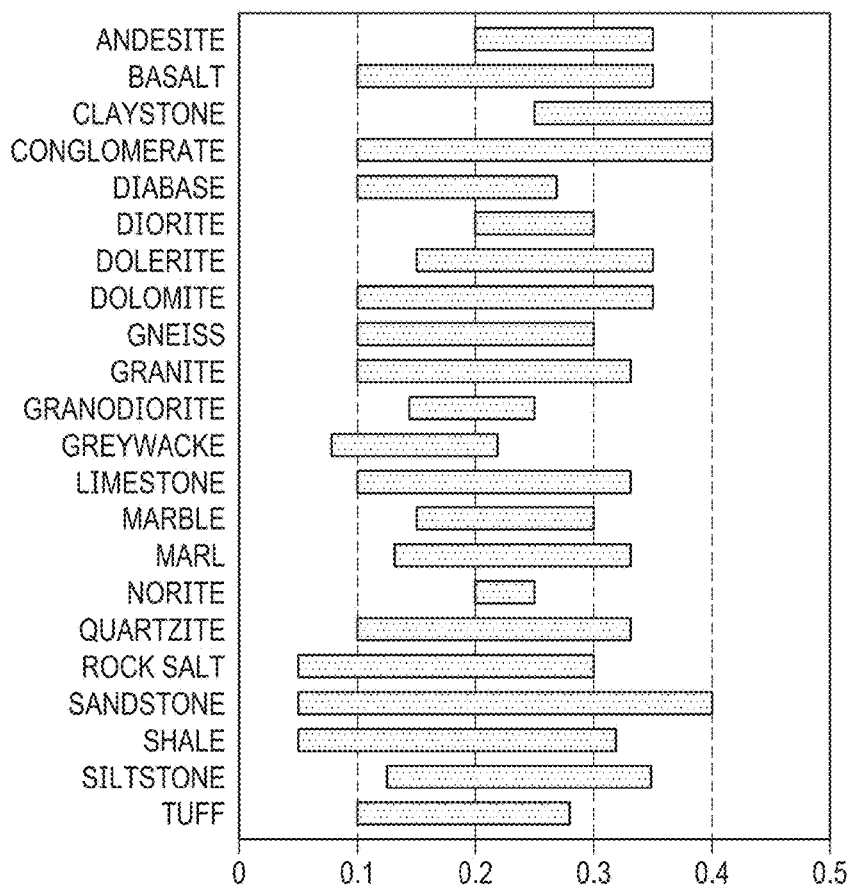
FIG. 11B is a bar graph display of typical values of Poisson's ratio for various types of rock.

FIG. 11B of the drawings illustrates in more graph form ranges of example values of Poisson's ratio for a number of types of formation rock typically encountered.

Unconfined Compressive Strength (UCS), a measure of a material's strength. The unconfined compressive strength is the maximum axial compressive stress that a cylindrical sample of material can withstand under unconfined conditions—the confining stress is zero. It is also known as the uniaxial compressive strength of a material because the application of compressive stress is only along one axis—the longitudinal axis—of the sample.

Tensile Strength (TS), the tensile strength of a material is the maximum amount of tensile stress that it can take before failure, for example creating a new tensile fracture.

Dynamic Rock Mechanical Properties 120

Dynamic rock mechanical properties are obtained based on measurements from the well logging tools. Suitable such well logging measurements are from compressional acoustic, shear acoustic and the bulk density logs. The dynamic rock mechanical properties so obtained are stored in memory of the data processing system D. The values for the dynamic rock mechanical properties are provided as inputs to calculate the dynamic Young's Modulus ($YM_D$) and dynamic Poisson's Ratio ($PR_D$).

Rock Physics Model 122

For the rock physics model 122, well log sonic acoustic and bulk density conditioning are performed to be able to calculate reliable mechanical properties and stress estimations by removing the wellbore and fluid effects. This enhances the accuracy and consistency for computing elastic properties and improving the correlations between acoustic measurements and rock properties.

The rock physics model 122 is focused on predicting dynamic pressure wave velocity Vp and shear wave velocity Vs as accurately as possible, which is suitable for further mechanical modeling. By using the porosity and clay content from well logs, an analysis of which rock physics models are most suitable is performed. Several techniques such as Advanced Differential Effective Medium (DEM) to estimate P-wave and S-wave velocities are available in Techlog™ 2017 platform suite available from Schlumberger Ltd. A tangential shear factor can be introduced to obtain optimal match with observed Vp/Vs ratios in the sandstones, since contact theory is known to over predict shear wave velocities by neglecting rotational freedom and slip at grain contacts. Vp and Vs are functions of porosity, clay content, differential pressure and saturation. The setup of input parameters can be completed iteratively to find the best solid clay properties to be used for this dataset. This can be thought of as inverting for solid clay elasticity for the dataset, assuming that all other properties are known, and the model is correct. Then calculated Vp and Vs may be calibrated with dynamic mechanical properties derived from core analysis to obtain the best fit between all available data.

Rock physics model 122 is formed based on physical principles to generate P-wave and S-wave velocities based on rock structure, composition and properties. By assigning known values to certain of these formation rock parameters, such as clay and sand bulk- and shear-modulus, model velocities can also be obtained in corrupted intervals. The main advantage of this approach is that all relation between elastic properties and rock quality are preserved.

Ultrasonic Rock Test 124

Rock elastic properties such as the Young's modulus and the Poisson's ratio can also be obtained from sonic or ultra-sonic acoustic logging measurements. These measurements are commonly referred to as "dynamic" measurements. The acoustic signal, generated by a transmitter in the well logging tool in the borehole, splits into two types of waves: compressional (longitudinal. P-waves) and shear (transverse, S-waves). The sheer or S-waves propagate into two forms traveling in the same direction to an acoustic receiver in the logging tool. The propagated shear waves oscillate in two different planes, perpendicular to each other. Acoustic velocities of the propagated waves are determined when detected by the receiver. These acoustic velocities include velocities of the P-wave (Vp) and velocities of the transverse S-waves (Vs1 and Vs2). These acoustic logging measurements can be made simultaneously with the static measurements while the sample is axially loaded, or separately while the sample is loaded hydrostatically. Based on the acoustic velocities (Vp, Vs1 and Vs2), the dynamic Young's modulus ($YM_D$) and the dynamic Poisson's ratio ($PR_D$) are determined based on the following relationships:

$$YM_D = \rho V_s^2 \frac{4V_p^2 - 3V_s^2}{V_p^2 - V_s^2}$$

$$PR_D = \frac{V_p^2 - 2V_s^2}{2(V_p^2 - V_s^2)}$$

The rock elastic properties obtained by the ultrasonic rock test 124 and the rock physics model 122 are provided as inputs as indicated schematically at 125 to the Stress Tensor Prediction Module 150.

Borehole Image Interpretation 126

Borehole images are obtained from borehole imaging well logging tools. The images are obtained as functions of borehole depth to provide subsurface geological information in terms of borehole shape and possible indications of mechanical failures. Examples of such mechanical failures are breakouts and drilling induced tensile fractures. These mechanical failure events can be used in the wellbore stability modeling to constrain the stress regime model, as will be described. The borehole imaging data is provided as indicated schematically at 127 to the Stress Regime Magnitude Optimization Module 170.

3D Geological Model 130

Geological model contains the main elements for the geological information such as structural, depositional, stratigraphy and reservoir properties in the 3D grid geo cellular model G (FIGS. 1 and 2).

Structural Framework 132

Faults and structural surfaces of the subsurface formations in the region of interest are stored in the memory of the data processing D as a 3-dimensional grid or data matrix structural framework as indicated at 132. The grid cells are typically formed as an unstructured grid representing the subsurface strata, with the dimensions and size of the grid cells governed by the desired degree of detail regarding the geological features, as well as the amount of computer processing time allocated. The structural framework is developed from seismic analysis and stratigraphy. The formed structural framework 132 is used in accordance with the present invention as an organizational matrix into which mechanical properties data are extrapolated. The grid cells in the structural framework data matrix stored in memory have associated mechanical properties of the subsurface structure at corresponding locations to the grid cells.

Petrophysical Properties 134

Data representing values for petrophysical properties of the subsurface are in memory of the data processing system in association with the data matrix of the structural framework 132. Petrophysical properties such as porosity and mineral volume are used to determine by a suitable correlation or co-kriging process digital values for the elastic properties and rock strength properties into the grid cells of the 3-D model. The correlations established between the dynamic and static mechanical properties are also preserved in relation with the petrophysical properties.

The structural framework 132 and the petrophysical properties 134 obtained for the three-dimensional grid model are provided, as indicated schematically at 135, to the Stress Tensor Prediction Module 150.

Completions and Drilling 140

Completions and drilling data are used to constrain or calibrate the stress regime by correlating the drilling events or troubles with the wellbore stability analysis. The main inputs developed during drilling that are stored in memory of the data processing system D and used in connection calibration of the stress regime are explained in the following paragraphs.

Fracture Closure Pressure 142

Figure 12:
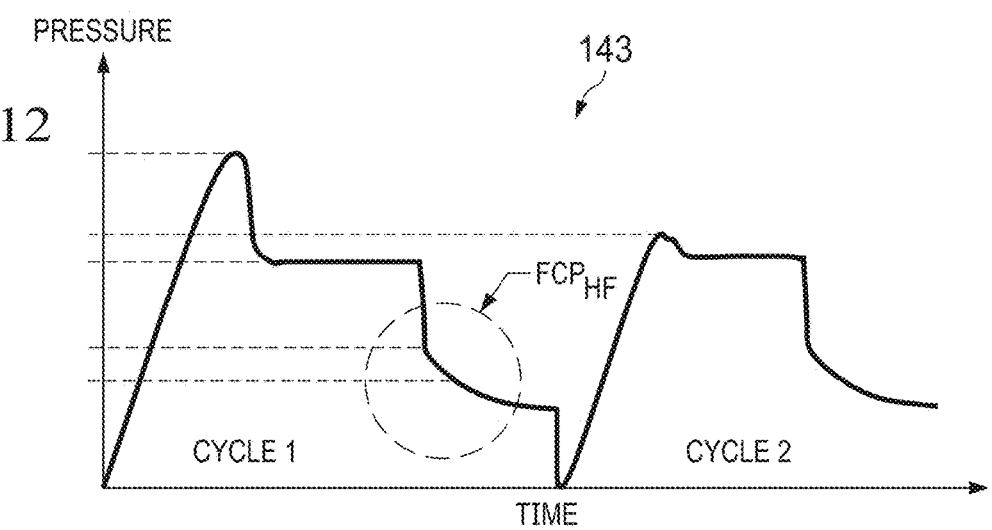
FIG. 12 is a schematic diagram of pressure as a function of time during formation pressure testing illustrating estimation of fracture closure pressure of a rock formation.

Fracture closure pressure ($FCP_{HF}$) is the fluid pressure needed to initiate the opening of a fracture. Fracture closure pressure is obtained from measures of well pressure as a function of time during the formation pressure testing. A data plot 143 (FIG. 12) illustrates well pressure as a function of time during two cycles of pressure testing.

Fracture closure pressure is equal to the minimum in-situ stress, because the pressure required to open a fracture is the same as the pressure required to counteract the stress in the rock perpendicular to the fracture. Examples pressure testing techniques suitable for use to obtain well measurements are those known as leak-off tests (LOT), extended leak-off tests (XLOT) and formation integrity tests (FIT).

Figure 12A:
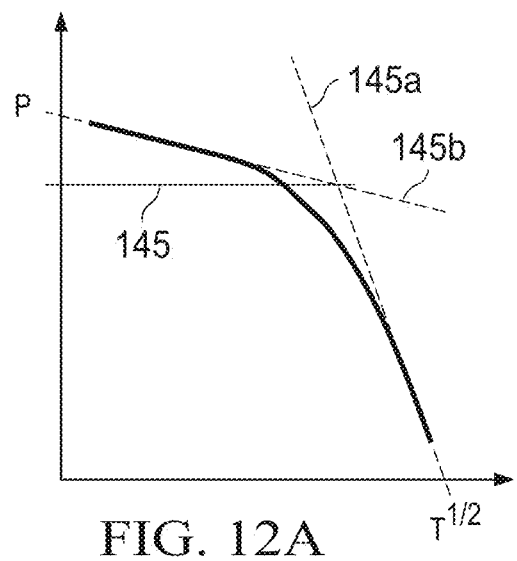
FIG. 12A is an enlarged view pressure decline as a function of time taken from a portion of FIG. 12.

FIG. 12A is a plot of pressure decline versus time illustrating at 145 a fracture closing pressure ($FCP_{HF}$) value. The Fracture closure pressure ($FCP_{HF}$) is defined as the fluid pressure needed to initiate the opening of a fracture and is equal to the minimum in-situ stress. This is because the pressure required to open a fracture is the same as the pressure required to counteract the stress in the rock perpendicular to the fracture. The pressure has been defined as the pressure valve magnitude at the intersection of lines in the FIG. 12A represented by the "G function derivative". The values of the fracture closure pressure so obtained are stored in memory of the data processing system D for stress regime optimization, as will be described.

Leak Off Test 144

A leak off test is performed to determine the strength or fracture pressure of a formation. The leak off test is usually conducted immediately after drilling below a new casing shoe. During the test, the well is shut in and fluid is pumped into the wellbore to gradually increase the pressure applied to the formation at the well depth of the formation. At some intensity of pressure, the pressurized fluid begins to enter the formation from the wellbore, and effect described as a leak off. As a result of the leak off, the pressurized fluid either moves through permeable paths in the rock or creates a space by fracturing the rock. The values of the leak off test pressure so obtained are stored in memory of the data processing system D for stress regime optimization, as will be described.

Injectivity Test 146

An injectivity test is conducted to establish the rate and pressure at which fluids can be pumped into the treatment target without fracturing the formation. Most stimulation treatments and remedial repairs, such as squeeze cementing, are performed following an injection test to help determine the key treatment parameters and operating limits. The values of the results of the injectivity test so obtained are stored in memory of the data processing system D for stress regime optimization, as will be described.

Drilling Troubles 148

The wellbore stability model which is formed during can also be constrained by the drilling trouble events, such as: mud lost circulation, stuck pipes, in-flow, tight hole, and the like. These drilling trouble events are generally used as observations and calibration points for the mechanical earth model during optimization of the stress regime in the Processing Stage Engine E.

Drilling troubles are reported as events during the drilling operation which are considered as problematic in terms of time and drilling performance, for example: mud loss circulations, stuck pipes, tight hole, fluid in-flow, and the like. These events can be used into the geomechanical model to calibrate the mud windows in wellbore stability modeling and analysis.

The completion and drilling data 140 formed and organized as described in the preceding paragraphs is provided as indicated schematically at 149 to the processing stage engine E.

Processing Stage Engine E

The procedure in the workflow was divided in two components: a Stress Tensor Prediction Module 150 and a Stress Regime Magnitude Optimization Module 170. The stress tensor prediction performed in Stress Tensor Prediction Module 150 is based on determination of stresses for a number of realizations based on different sets of values for formation parameters provided by Data Input and Conditioning Stage C. The tensor predictions or estimates are determined using a suitable geomechanics numerical simulator.

The Stress Regime Magnitude Optimization Module 170 determines three principal stresses (maximum horizontal stress $\sigma_{Hmax}$, minimum horizontal stress $\sigma_{hmin}$ and vertical stress $\sigma_V$). The Stress Regime Magnitude Optimization Module 170 also provides quantification of the three principal stresses based on rock strength properies while modeling the wellbore stability incorporating drilling parameters.

A stress magnitude quantification performed by Stress Tensor Prediction Module 150 through each realization is controlled by several sets of parameters which are distributed into the 3D geo-cellular grid model G of the subsurface region of interest. The parameters include, for example, acoustic sonic wave data, bulk density, elastic properties, rock strength properties, fluid pore pressure and stress boundary conditions. These components are used to model an "in-situ" stress regime magnitude to produce a reliable mechanical earth model by using the poro-elasticity equation, and simulating the stress regime through a finite element geomechanics simulator.

An example of such finite element geomechanical simulation is set forth in: Koutsabeloulis, N. C., et al. "Numerical Geomechanics in Reservoir Engineering", *Computer Methods and Advances in Geomechanics* (The Netherlands, A. A. Balkema, Rotterdam) pp. 2097-2104, 1994.

It should be understood that other finite element geomechanical simulation methods may also be used.

The calibration process for the mechanical earth model performed in Stress Regime Magnitude Optimization Module 170 constrains the minimum horizontal stress magnitude $\sigma_{Hmin}$ with well measurements of fracture closure pressure ($FCP_{HF}$) obtained by formation mechanical testing as has been described. The maximum horizontal stress $\sigma_{Hmax}$ is determined based on the poro-elasticity equation and wellbore stability modeling, and calibrated with wellbore failure analysis such as "breakouts" and "drilling induce tensile fractures" from borehole image interpretation.

Stress Tensor Prediction Module 150

The stress tensor prediction shown schematically at 50 in FIG. 2 is performed in in Processing Stage Engine E by Stress Tensor Prediction Module 150. As indicated at 158 (FIG. 8) a suitable finite element stress prediction simulator determines stress tensor matrix components. An example of such finite element stress prediction simulator is set forth in Engelder, T., and Leftwich. Jr., J. T., "A Pore-Pressure Limit in Overpressured South Texas Oil and Gas Fields," AAPG Memoir 67, pp. 255-267, 1997. It should be understood that other finite element stress prediction simulator methods may also be used.

Figure 13:
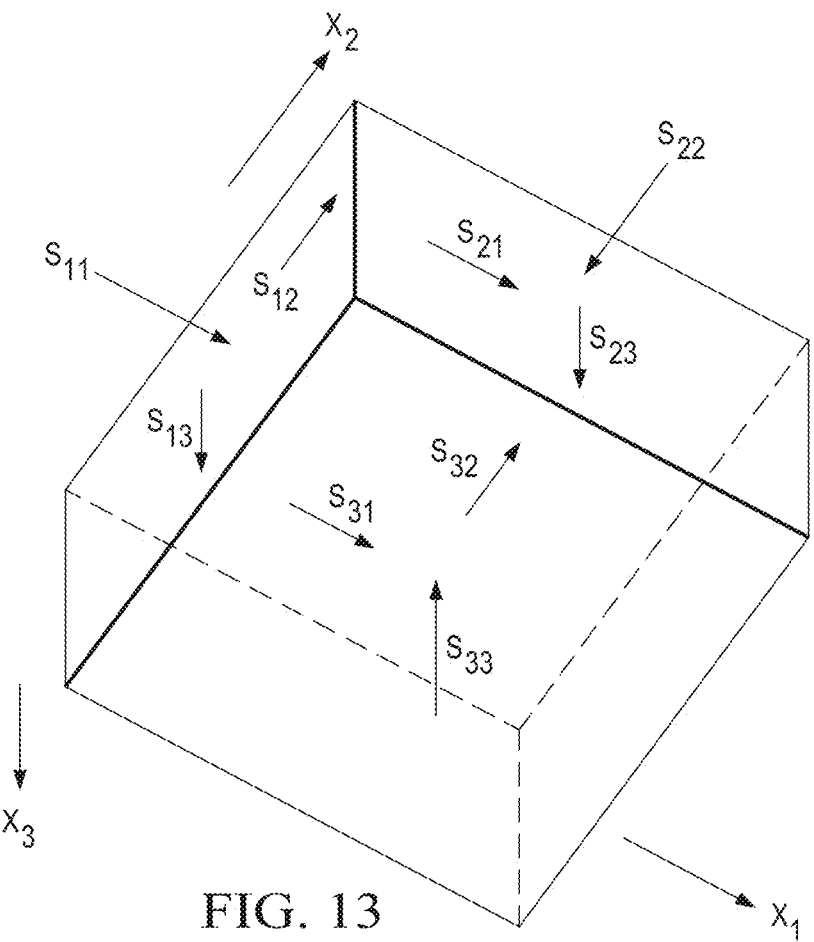
FIG. 13 is a schematic diagram of matrix components of stress tensors involved in processing according to the present invention.

Under equilibrium conditions the stress tensors can be simplified in six components as shown defined in a Cartesian domain of coordinates $X_1$, $X_2$, $X_3$ in FIG. 13 as: σ12=σ21, σ13=σ31, σ23=σ32.

Expressed in matrix format, the stress tensors shown in FIG. 13 are as follows:

$$\begin{pmatrix} \sigma 11 & \sigma 12 & \sigma 13 \\ \sigma 21 & \sigma 22 & \sigma 23 \\ \sigma 31 & \sigma 32 & \sigma 33 \end{pmatrix}$$

Figure 14A:
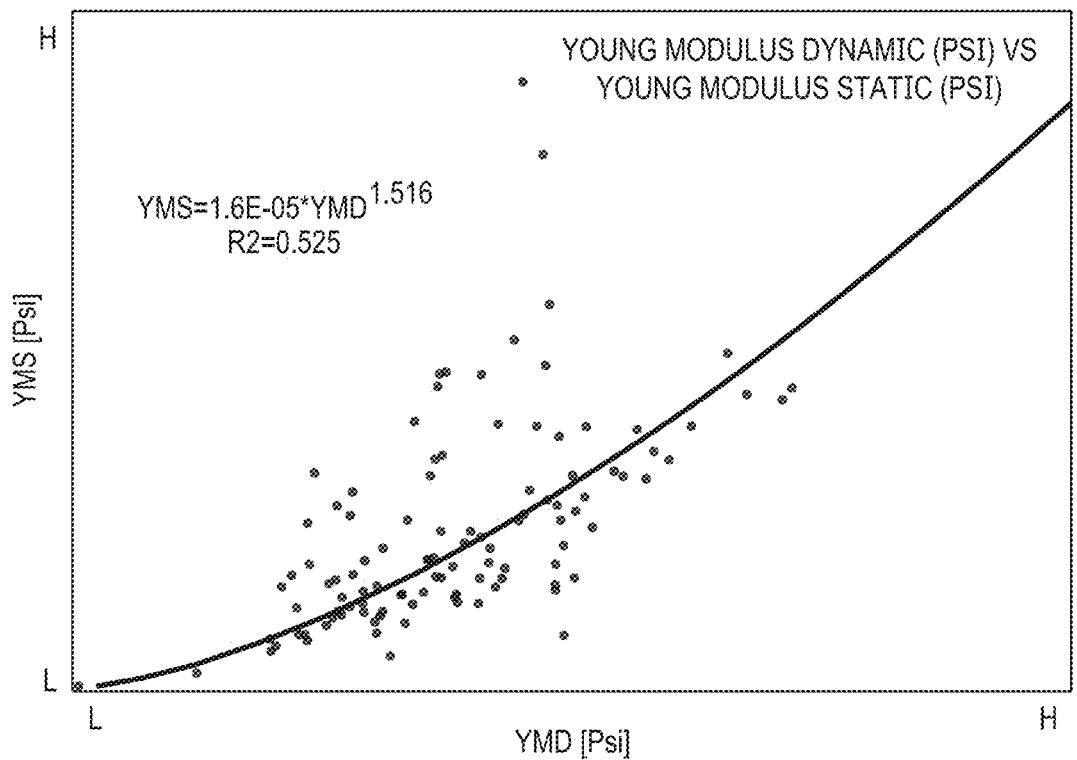
FIGS. 14A, 14B, 14C and 14D are plots of correlation for selected reservoir rock formation parameters or variables for processing according to the present invention.
Figure 14B:
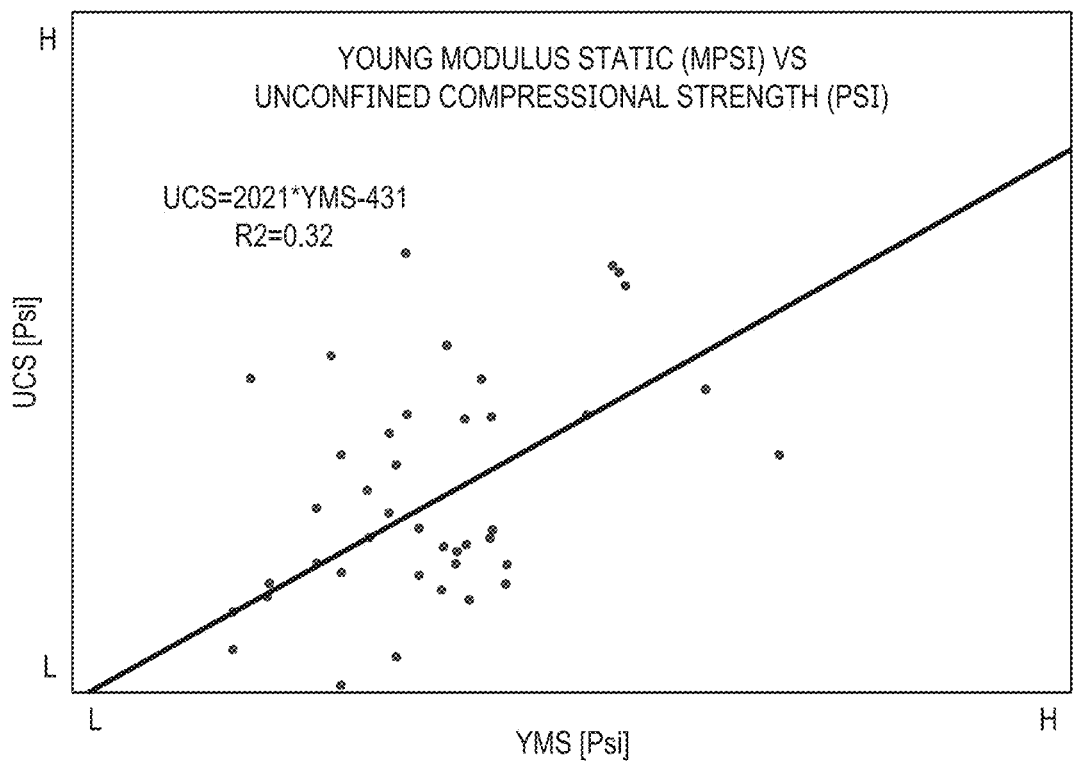
Figure 14C:
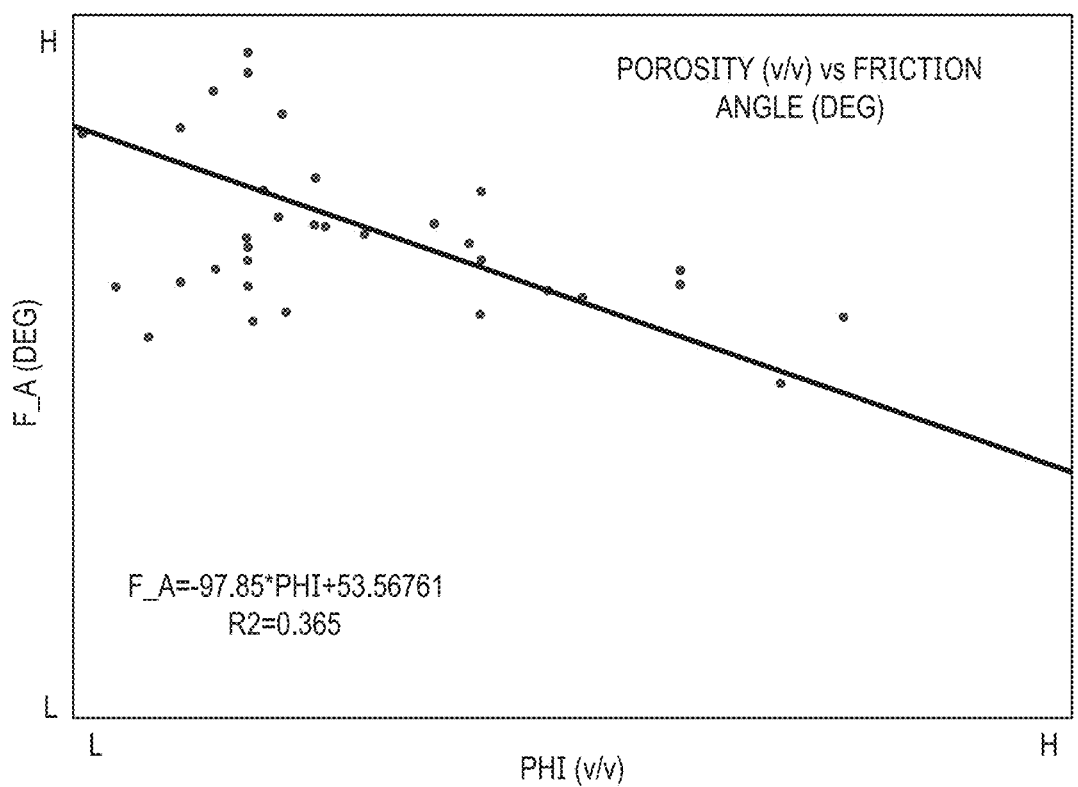
Figure 14D:
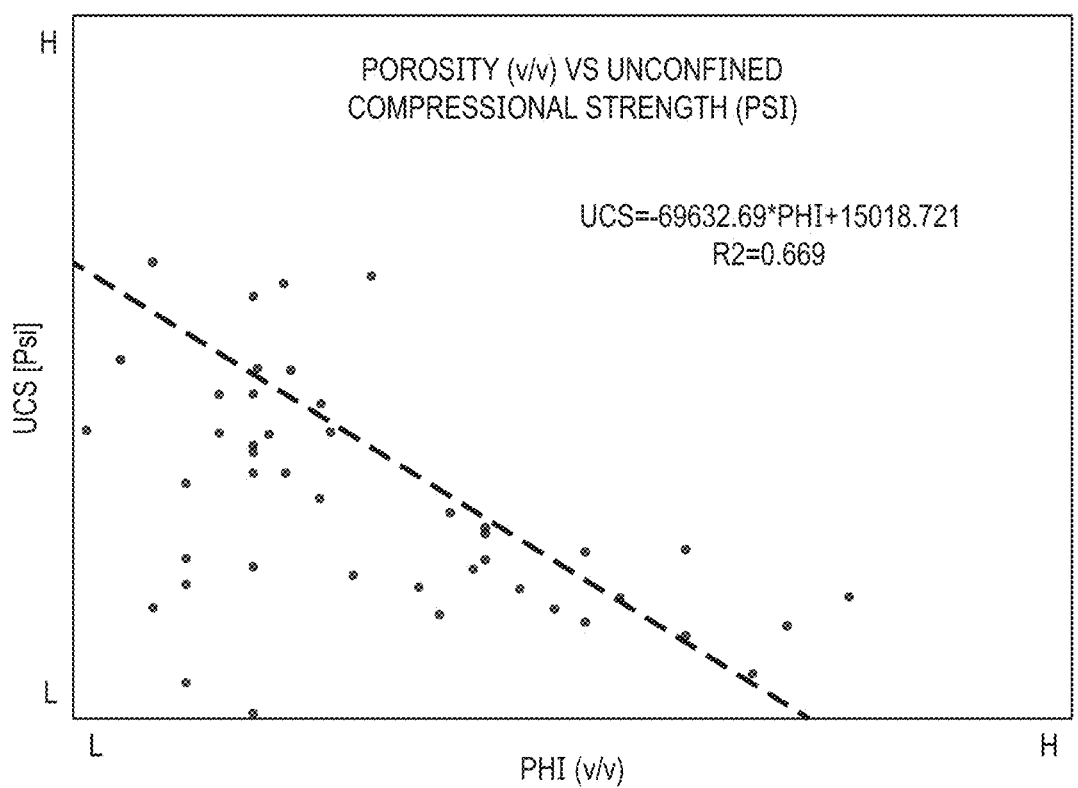

The stress tensor prediction 158 performed in Stress Tensor Prediction Module 150 is based on transforming relationships expressed in terms of dynamic rock mechanical properties to relationships expressed in terms of static rock mechanical properties. This is done as indicated schematically at 152 (FIG. 8) based on suitably determined rock strength properties correlations indicated schematically at 30 in FIG. 2. The rock strength properties are defined based on correlation functions. Examples of such correlation functions according to the present invention are between the dynamic Young's Modulus vs. static Young's Modulus (FIG. 14A); static Young's Modulus vs. Unconfined Compressional Strength (FIG. 14B); Porosity vs. Friction Angle (FIG. 14C); and Porosity vs. Compressional Strength (FIG. 14D). Poisson's ratio dynamic and static correlations also needed to be established to introduce the parameters.

The relations between the rock strength properties parameters can for example be initially defined by a best fit correlation R2, between the static/dynamic elastic and the rock strength rock properties. The best fit correlation is determined by calculating an equation and variables for each rock strength properties correlation parametrizing a range of variability of each component. Examples of such correlations defined by the correlations for example:

$YM_S = a1*(YM_D)^{a2}$ $UCS = b1*YMS + b2$ $PR_S = c1*(PR_D)$ $F_{angle} = d1*\Phi e + d2$ $TS = e1*UCS$ It should be understood that these correlations are given by way of example, and that the expression of these correlations may be changed from reservoir to reservoir and the variability can be defined by using standard deviation coefficients.

The 3D mechanical properties calculation indicated schematically at 154 in the FIG. 8, corresponds to the elastic properties determined according to the initial correlations established by rock mechanics correlation process step 152. In order to perform these determinations, a compressional velocity (Vp), shear velocity (Vs) and bulk density model have to be extrapolated from the wells to the entire 3D grid model based on geostatistical techniques. This process can be performed by using a software package such as Petrel™, etc.

Stress boundary conditions indicated schematically at 40 in FIG. 2 are received as indicated at 156 (FIG. 8) as inputs for stress tensor prediction as inputs for the geomechanical model to predict the stress and "strain tectonic regime" of the stress tensors. This method is performed to be able to solve the poro-elasticity equations, minimum stress gradient, vertical stress gradient and maximum horizontal stress direction.

The fluid pore pressure can be defined by using seismic velocity using what is known as the compaction line technique or by using the reservoir pressure defined through a reservoir numerical simulations process.

Defining the fluid pore pressure variables and their variability, the 3D boundary condition stress analysis involves determination of stress equilibrium values representing the present-day or pre-production conditions throughout a reservoir and its surroundings. Processing then is transferred to step 158 for stress prediction in the manner described in previous paragraphs.

Due to the complex variation of structure and properties within a typical model, stress equilibrium must be solved by numerical simulations. A geomechanical numerical simulator for example Visage™ software uses a finite element method to determine the required solution, producing a 3D stress tensor for stress equilibrium conditions as shown in FIG. 13 incorporating the magnitudes and orientations that vary both laterally and vertically. The 3D stress tensor for stress equilibrium conditions σ12=σ21, σ13=σ31, σ23=σ32 are then provided as indicated at 159 as inputs to Stress Regime Magnitude Optimization Module 170.

Stress Regime Magnitude Optimization Module 170

Figure 19:
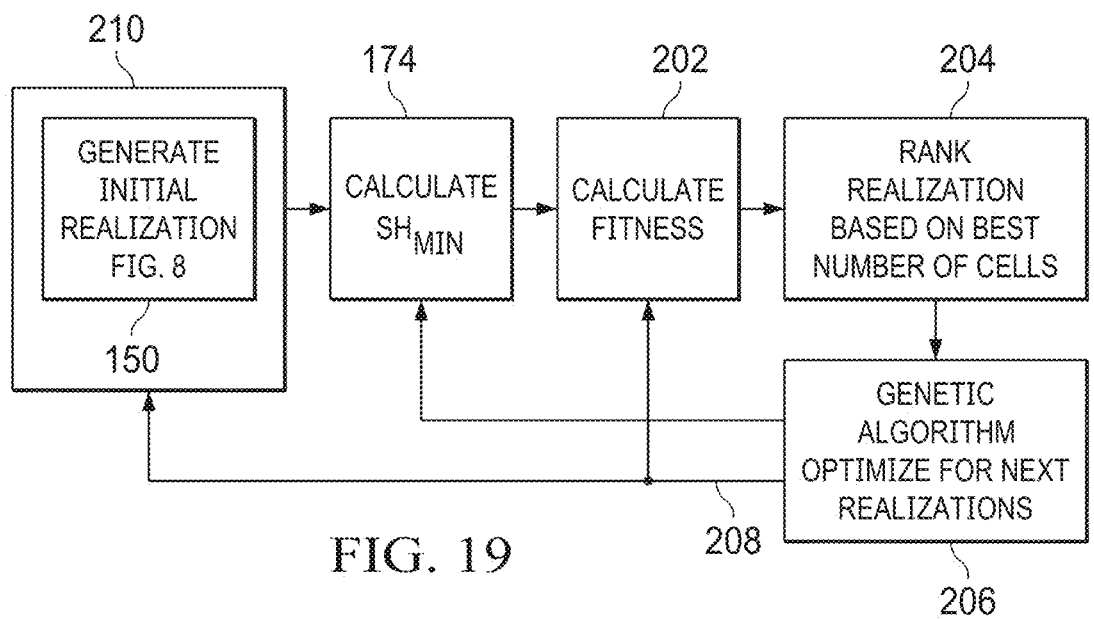
FIG. 19 is a schematic diagram of a portion of the workflow of FIG. 3 for determination of calibrated minimum horizontal stress magnitude using fracture closure pressure and multiple mechanical earth model realizations according to the present invention.

Optimization in the Stress Regime Magnitude Optimization Module 170 begins with capturing a range of variability for each rock property and formation parameter variable introduced in the model. As has been described, these variables include elastic properties conversion from dynamic to static for the Young's Modulus (E) and Poisson's Ratio (v); Unconfined Compressive Strength (UCS); Tensile Strength (TS); stress boundary conditions; and petrophysical properties as porosity, mineral volume, and the like. The variables are ranked during optimization and quantified for their impact on the stress prediction particularly in the minimum horizontal stress ($\sigma_{hmin}$) quantification. The optimization processing then determines the difference between the simulated stress profile and an actual measurement calculated through an objective function by using an optimization methodology 200 (FIG. 19), as will be described. The optimization methodology 200 minimizes the difference by sampling from the distribution of each parameter creating iteratively new realizations.

The stress regime magnitude optimization module 170 as indicated at 172 determines three principal stresses (maximum horizontal stress $\sigma_{Hmax}$, minimum horizontal stress $\sigma_{Hmin}$ and vertical stress $\sigma_V$) based on the predicted stress tensors formed in Stress Tensor Prediction Module 150.

Principal Stress

Principal stress tensor can be defined by using what is known as an Anderson classification scheme, as described in Zoback, M. D., "Reservoir Geomechanics," Cambridge University Press, Chapter 11, Critically Stressed Faults and Fluid Flow, pp. 340-377, 2007. The Anderson classification scheme classifies an area as being characterized by normal, strike-slip or reverse faulting based on the horizontal principal stress magnitudes with respect to the vertical stress.

The vertical stress, $S_v$, is the maximum principal stress ($\sigma 11$) in normal faulting regimes, the intermediate principal stress ($\sigma 22$) in strike-slip regimes and the least principal stress ($\sigma 33$) in reverse faulting regimes.

Calculating the minimum horizontal stress magnitude from a matrix stress tensor according to the present invention is constrained by additional information regarding characteristics of the formation rock obtained by actual measurements from the well. As has been discussed, these measurements may be obtained from testing, such as leak off test (LOT) or formation integrity testing (FIT); or from drilling events such as mud loss circulation, to provide an approximated $\sigma_{hmin}$ magnitude for use in the wellbore stability analysis.

The minimum horizontal stress $\sigma_{Hmin}$ is then furnished as indicated at 174 for determination as shown at 176 if a wellbore stability failure condition is present in the subsurface formation that the location of interest.

The Stress Regime Magnitude Optimization Module 170 also receives as input for determination during step 176 values of the leak off test pressure, results of injectivity testing and drilling trouble events which have been reported as events from the completion and drilling module 140 of the Data and Input Conditioning Stage C.

The stress regime magnitude optimization module 170 also receives as indicated at 178 values of fracture closure pressure ($FCP_{HF}$) formed in the Data and Input Conditioning Stage C. The fracture closure pressure values are evaluated as indicated at 180 to determine if such values are affected by the presence of a natural fracture in the formation under investigation. If so, as indicated at 182 the presence of a natural fracture is reported. If as a result of step 180 the presence of a natural fracture is not indicated, wellbore stability is evaluated as indicated at 176. If a failure condition is noted to exist in wellbore stability during step 176, processing returns to the Stress Tensor Prediction Module 150 for creation of a new realization, as indicated at 179.

Wellbore Stability Conditions

Before a wellbore is drilled, the formation rock is in a state of equilibrium. This state is the initial state or "in-situ" conditions. Once a well is drilled, wellbore stresses (FIG. 15) are introduced and perturbations in the local stress field created. These are generally controlled by the interaction between the mud and formation interface during drilling.

Figure 15A:
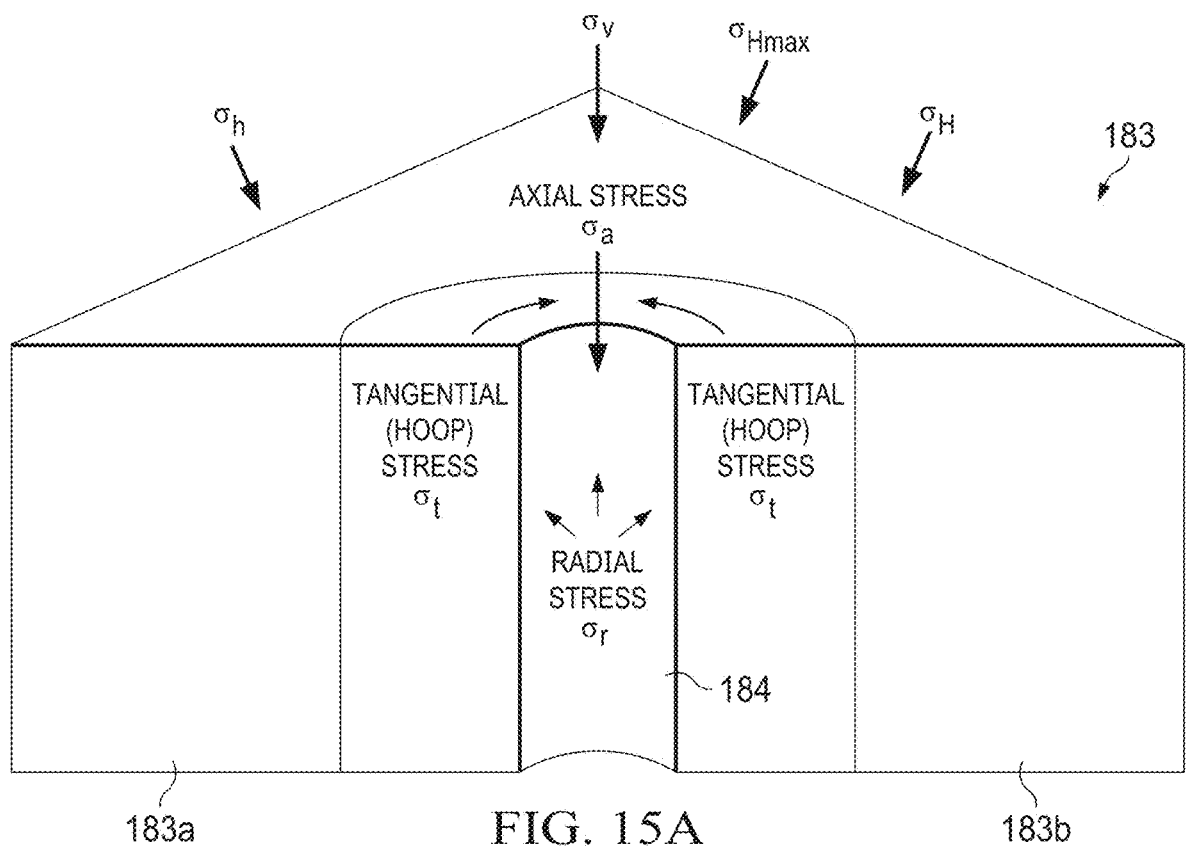
FIGS. 15A, 15B and 15C are schematic diagrams illustrating wellbore stresses as a result of perturbation of the formation rock as a result of drilling operations.

As shown in FIG. 15A, a rock mass 183 in the region of a wellbore 184 is subjected to principal stresses: $\sigma_{Hmax}$, $\sigma_{Hmin}$, and $\sigma_v$. In an annular region of 185 adjacent wellbore 184, axial $\sigma_a$, radial $\sigma_r$ and tangential $\sigma_t$ stresses as a result of drilling are present as indicated.

Figure 15B:
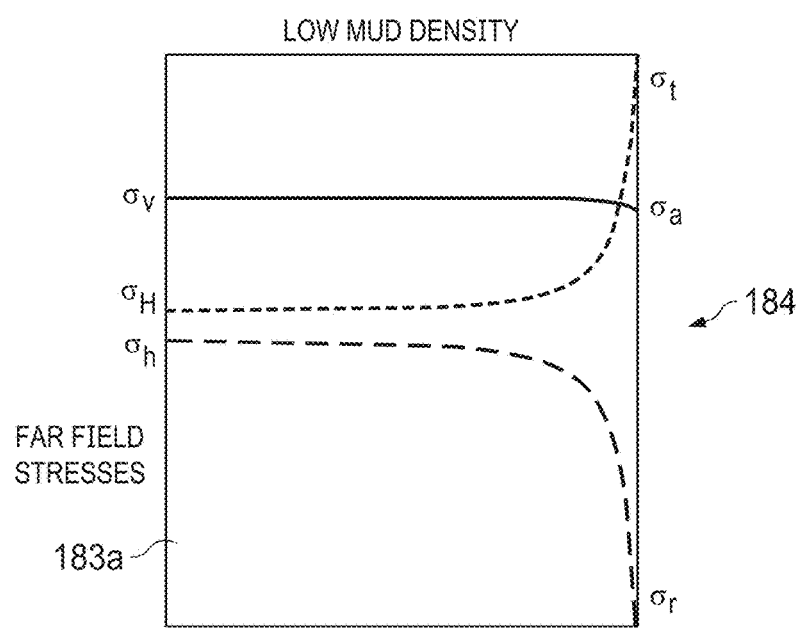

FIG. 15B is a cross-sectional view of a portion 183a of the rock mass 183 adjacent the wellbore 184 under conditions of low mud density. FIG. 15B illustrates superimposed on the rock mass 183a comparative relative magnitudes in subsurface rock adjacent the wellbore to far field stresses at spaced locations from the wellbore. Both the principal stresses ($\sigma_{Hmax}$, $\sigma_{Hmin}$, and $\sigma_v$) and the axial, radial and tangential stresses ($\sigma_a$, $\sigma_r$, $\sigma_t$ respectively) are shown on the rock mass 183a.

Figure 15C:
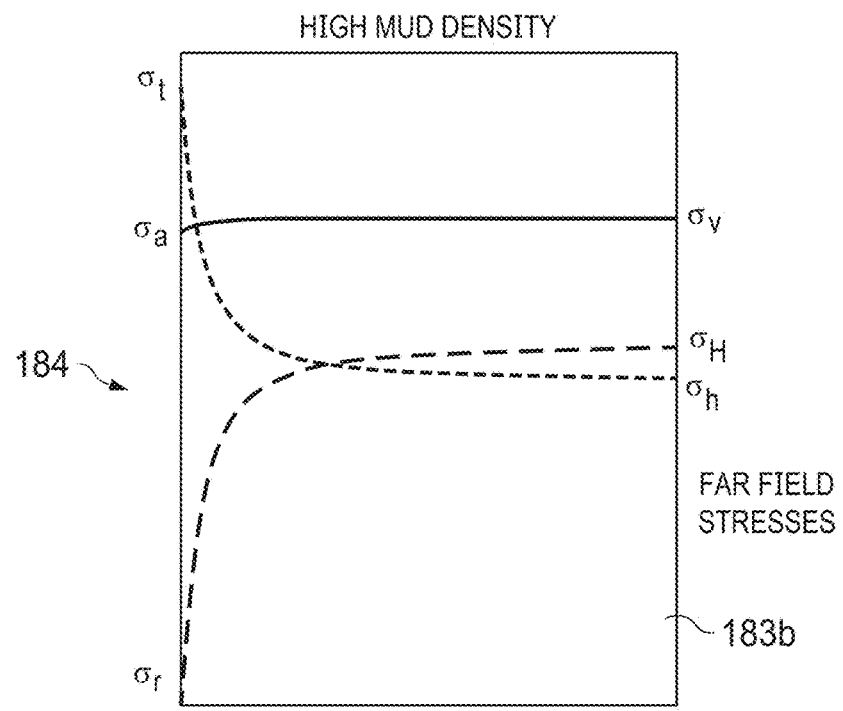

FIG. 15C is a comparable cross-sectional view of a portion 183b of the rock mass 183 adjacent the wellbore 184 under conditions of high mud density. FIG. 15C illustrates superimposed on the rock mass 183b comparative relative magnitudes in subsurface rock adjacent the wellbore to far field stresses at spaced locations from the wellbore. Both the principal stresses ($\sigma_{Hmax}$, $\sigma_{Hmin}$, and $\sigma_v$) and the axial, radial and tangential stresses ($\sigma_a$, $\sigma_r$, $\sigma_t$ respectively) are shown on the rock mass 183b.

Figure 16:
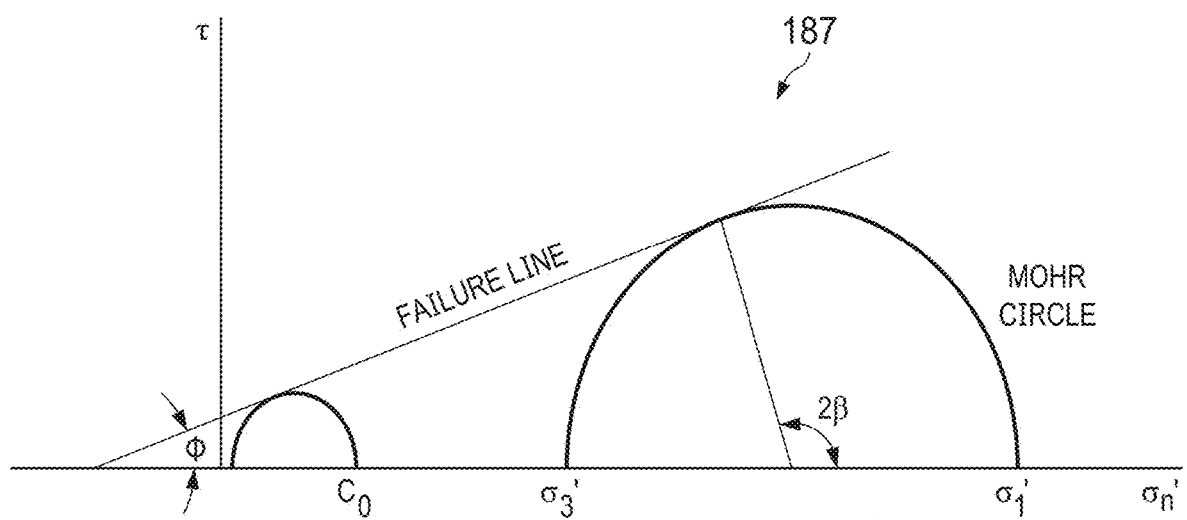
FIG. 16 is a Mohr circle diagram indicating conditions in which shear failure occurs.

Two main rock failure criteria can be modeled based on the wellbore stress conditions: shear and tensile failure. FIG. 16 represents graphically at 187 interrelation for rock samples between normal stress $\sigma$, shear stress r and coefficient of friction $\phi$ in a rock matrix in what is known as a Mohr diagram or circle. FIG. 16 thus is a plot of conditions when rock failure occurs.

Shear Failure

Shear failure is caused by two perpendicular stresses acting on the same plane, and is defined in conjunction with the Mohr diagram 187 by the following equation expressing stress conditions shown schematically in FIG. 16:

$$\sigma 1' \geq C0 + \sigma 3' \tan 2\beta$$

where
C0=Unconfined compressive strength
$\sigma 1'$=Maximum effective stress
$\sigma 3'$=Minimum effective stress
$\beta$=Angle between the normal stress and the maximum effective stress $\sigma 1'$ $$\beta = 45° + \frac{\Phi}{2};$$

where $\varphi$ is the friction angle
If the maximum effective stress $\sigma 1'$ is exceeded, then the conditions for shear failure are satisfied.

Tension Failure

Tension failure occurs when a formation is subject to a tensile stress. The rock is pulled apart parallel to the tensile stress, creating a perpendicular crack failing the formation in tension mode. The criteria for tension failure is defined in conjunction with the Mohr diagram 187 by the following equation expressing stress conditions shown schematically in FIG. 16:

$$\sigma 3' \leq -TS$$

where TS=Tensile strength of the material; and $\sigma 3'$=Minimum effective stress.

Since tensile and shear failure are completely independent of one another, wellbore stability conditions can be evaluated by a qualitative match using the breakouts and drilling tensile fracture from borehole image interpretation.

Figure 17:
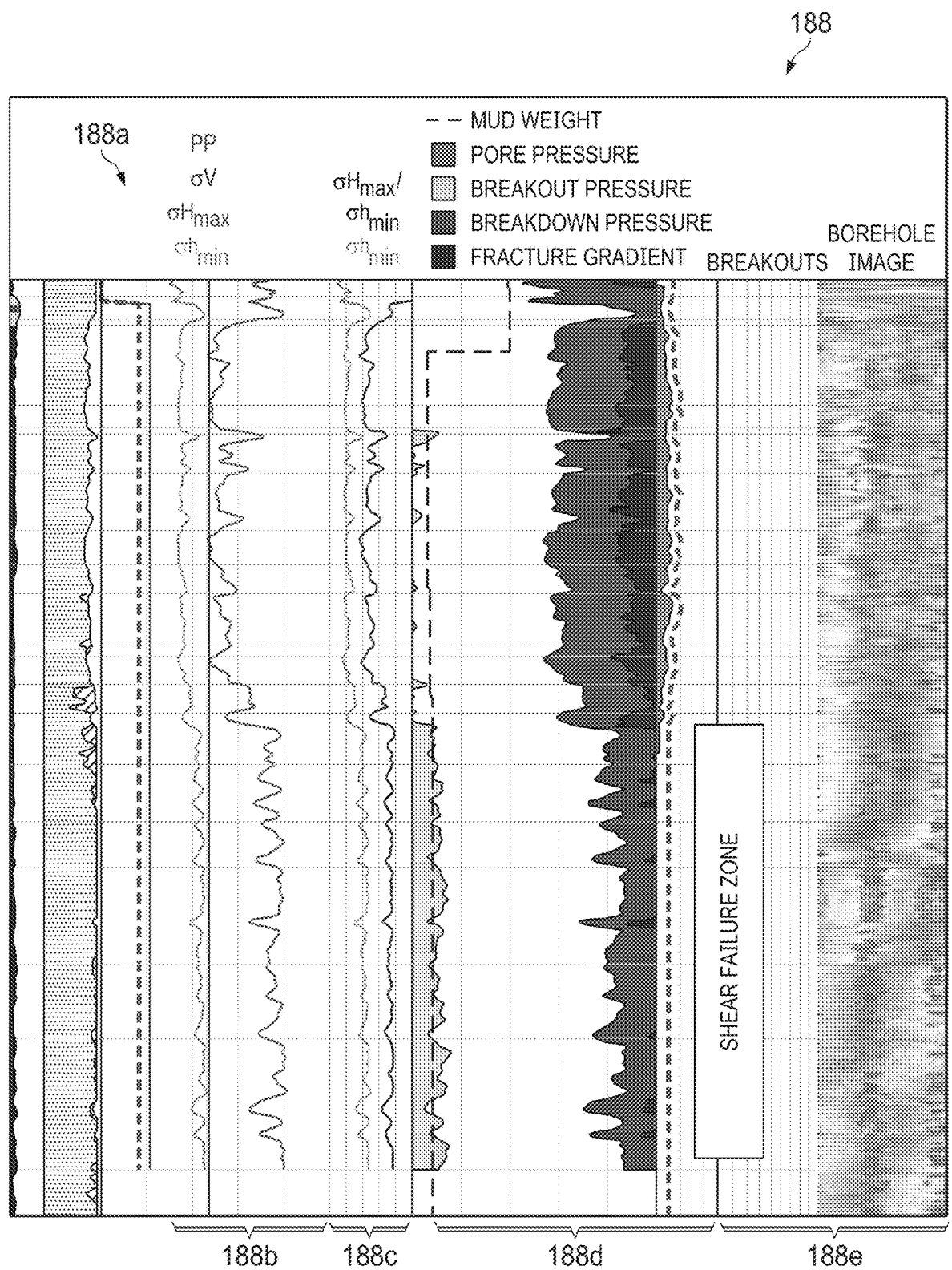
FIG. 17 is an example plot of formation stress conditions; pressures and borehole image log data as a function of borehole depth.

A qualitative match between breakout and shear failure zone is illustrated by interaction between the mud weight, breakout pressure and breakdown pressure as show in FIG. 17. FIG. 17 is a data plot 188 in a color keyed well log format as a function of borehole depth showing in a first or leftmost track 188a information related to the lithology. A second track 188b shows the principal stress calculations: $\sigma_{Hmax}$, $\sigma_{Hmin}$, $\sigma_v$ and pore pressure (PP), calculated from the steps 158, and a third track 188c shows again the $\sigma_{Hmin}$, and also ratio $\sigma_{Hmax}/\sigma_{Hmin}$. A fourth track 188d shows graphically results of the calculation of breakdown and breakout pressure. A fifth track 188e shows breakouts interpreted from a borehole image log. These breakouts are interpreted from borehole image log and are use as hard data to calibrate the stress model in case the image log shows evidence of breakouts. The wellbore failure from wellbore stress must show the breakout pressure exceeding the mud weight pressure (yellow area in the track 4) as indicative of breakout creation (Shear Failure Zone).

Figure 9:
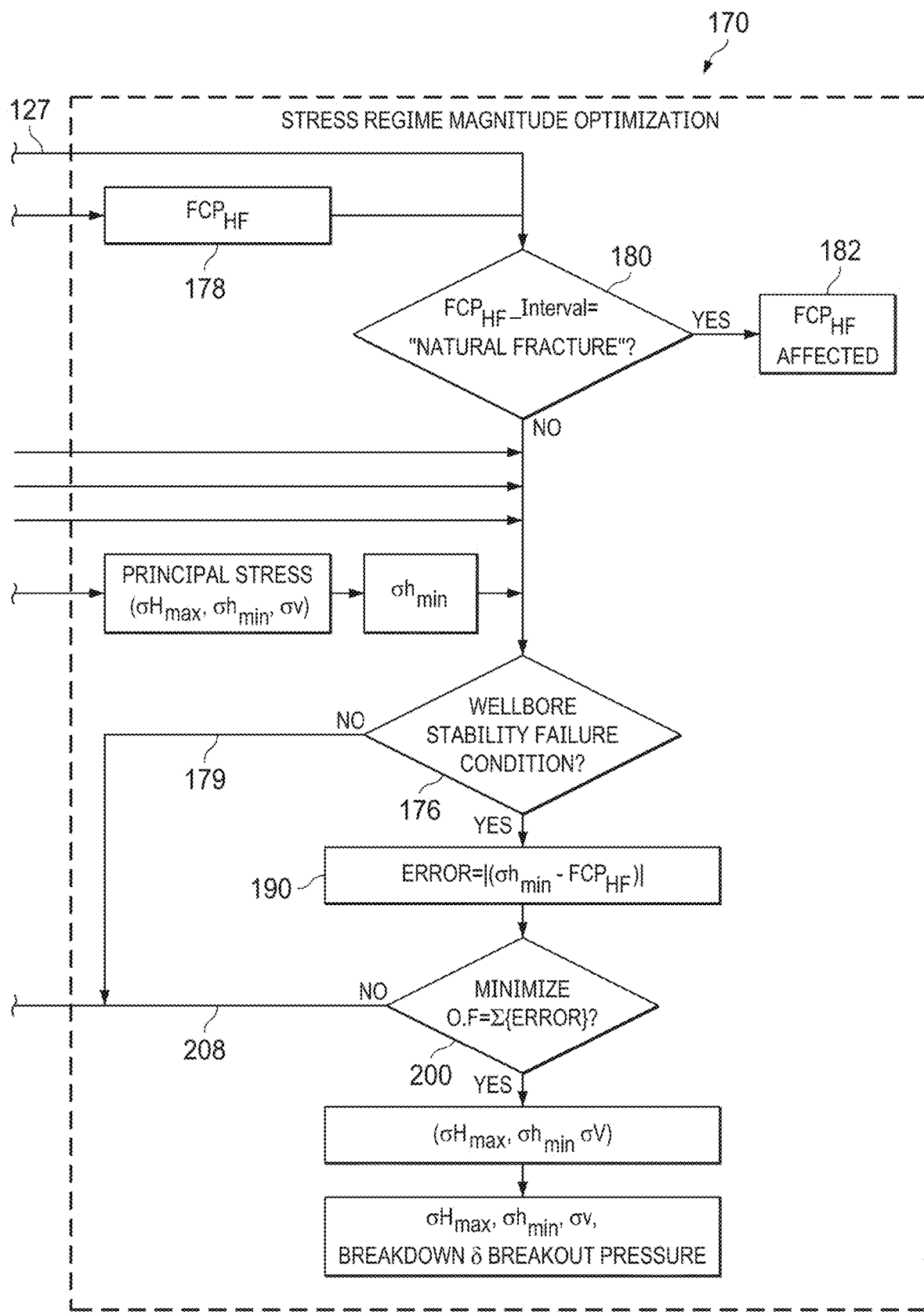
FIG. 9 is a schematic diagram of workflow of a component portion of the workflow of FIG. 3.

Considering again the Stress Regime Magnitude Optimization Module 170 (FIG. 9), if a wellbore stability failure condition is noted during step 176, during step 190 an error function is determined for the present realization generated by the Stress Tensor Prediction Module 150. The error function so determined is also stored in memory of the data processing system D. The error function represents the difference in magnitude between the minimum horizontal stress $\sigma_{Hmin}$ for the present realization generated by the Stress Tensor Prediction Module 150 and the fracture closure pressure ($FCP_{HF}$). An error function of this type is obtained for each of the different realizations of predicted stress tensors formed in the Stress Tensor Prediction Module 150.

Figure 18:
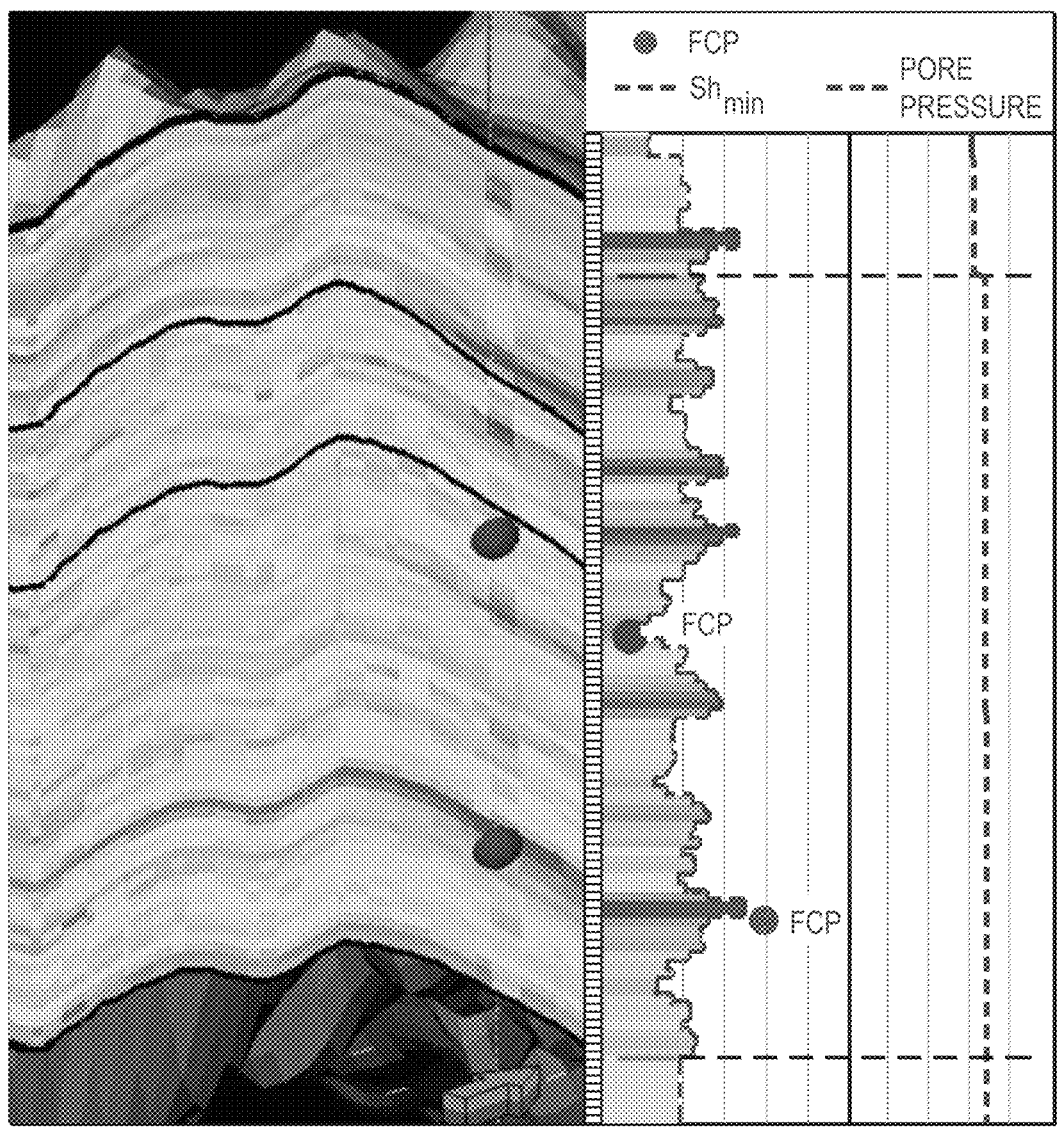
FIG. 18 is a plot of quantitative error between fracture closing pressure and minimum horizontal stress determined according to the present invention as a function of depth in a well borehole.

FIG. 18 represent an example of prediction of the $\sigma_{Hmin}$ within a 3D mechanical earth model, illustrates profile of a color-keyed stress profile predicted by the model for an example one of the wells against a fracture closure pressure ($FCP_{HF}$); the results of such a comparison may produce a quantitative error defined as the difference between the fracture closure pressure and the minimum predicted horizontal stress.

Optimization Methodology

During step 200 (FIGS. 9 and 19), a minimization of an objective function represented by the cumulative total of the error functions formed during step 190 is performed. The objective function is provided according to the present invention to minimize the difference between the minimum horizontal stress predicted and the fracture closure pressure by quantifying a cumulative error for all the wells with the available information. The objective function (O.F.) defined as the minimization of the cumulative error for "n" numbers of wells from the difference in absolute value between $\sigma h_{min}$ and the fracture closure pressure $FCP_{HF}$.

$$O.F. = \text{Minimize}\left(\sum_{i=1}^{n} |FCP_{HF(i)} - \sigma h_{min(i)}|\right)$$

The minimization is obtained by a computerized processing methodology known as a Genetic Algorithm. An example of a genetic algorithm which is available as a part of the MATLAB processing product available from The MathWorks. Inc. may be used for performing optimization step 200.

In Genetic Algorithm optimization during step 200 for minimization of the objective function representing the error functions of predicted stress tensors, a population of candidate solutions for the optimization processing is evolved toward an optimum solution. Each candidate solution has a set of properties representing different sets estimated measures of tensor stresses in the grid cells of the grid cell model of the a subsurface geological structure based on postulated properties of the subsurface reservoir.

The Genetic Algorithm optimization during step 200 (FIG. 19) begins with input in the form of $\sigma h_{min}$ values obtained during step 174 based on a population of randomly generated individual candidate solutions. Optimization during step 200 is an iterative process, with the population in each iteration called a generation. In each generation, the fitness of each individual candidate solution in the population is evaluated during step 202.

The evaluation during step 202 is performed by determining a Euclidean difference between fracture closure pressure $FCP_{HF}$ and minimum horizontal stress $\sigma h_{min}$. The resultant evaluated fitness from step 202 is then during step 204 ranked in order of magnitude with values of the objective function obtained from previous iterations. The results are stored in memory of the data processing system D.

Table 2 below is a prophetic example of evaluated fitness from step 202 having been ranked during step 204 according to the present invention.

| a1 | a2 | b1 | b2 | b1 | d1 | d2 | e1 | Fitness |
|---|---|---|---|---|---|---|---|---|
| 1.6E-05 | 1.516 | 2021 | -431 | 1.05 | -50 | 60 | 0.12 | 541 |
| 1.6E-05 | 1.516 | 2021 | -431 | 1.05 | -50 | 60 | 0.12 | 132 |
| 1.6E-05 | 1.516 | 2021 | -431 | 1.05 | -50 | 60 | 0.12 | 756 |
| ***** | ***** | ***** | ***** | ***** | | | | ***** |
| ***** | ***** | ***** | ***** | ***** | | | | ***** |

During step 206, another suitable candidate solution is stochastically selected from the current population modified to form a new or next successive generation. The new generation of candidate solutions is then used in the next iteration of the optimization. Processing is returned as indicated at 208 to Stress Tensor Prediction Module 150 for formation of a new realization of predicted stress tensors based on another set of reservoir rock properties from the Data and Input Conditioning Stage C in the manner previously described.

The optimization terminates when a satisfactory fitness level has been reached for the population during step 204. When the minimization operation during step 200 is successful, the stress tensors giving rise to an acceptable minimized function from step 200 are accepted as suitable values of stress tensors for the geological model being formed. The stress tensors values so obtained by the Stress Regime Magnitude Optimization Module 170 also provide quantification of the three principal stresses, namely the maximum horizontal stress $\sigma_{Hmax}$, minimum horizontal stress $\sigma_{hmin}$ and vertical stress $\sigma_v$ for each of the grid cells of geomechanical model being formed.

The quantified three principal stresses as optimized in the Stress Regime Magnitude Optimization Module 170 are then stored in memory of the data processing system D and the completed geomechanical model is available for use in characterizing the nature of the reservoir in a three dimensional grid cell model of the reservoir as suitable for hydrocarbon production well operations. Example types of well operations include drilling a multilateral well based on the results of the characterization, and fracturing the formation at an appropriate location indicated by the results of the characterization.

Data Processing System D

Figure 20:
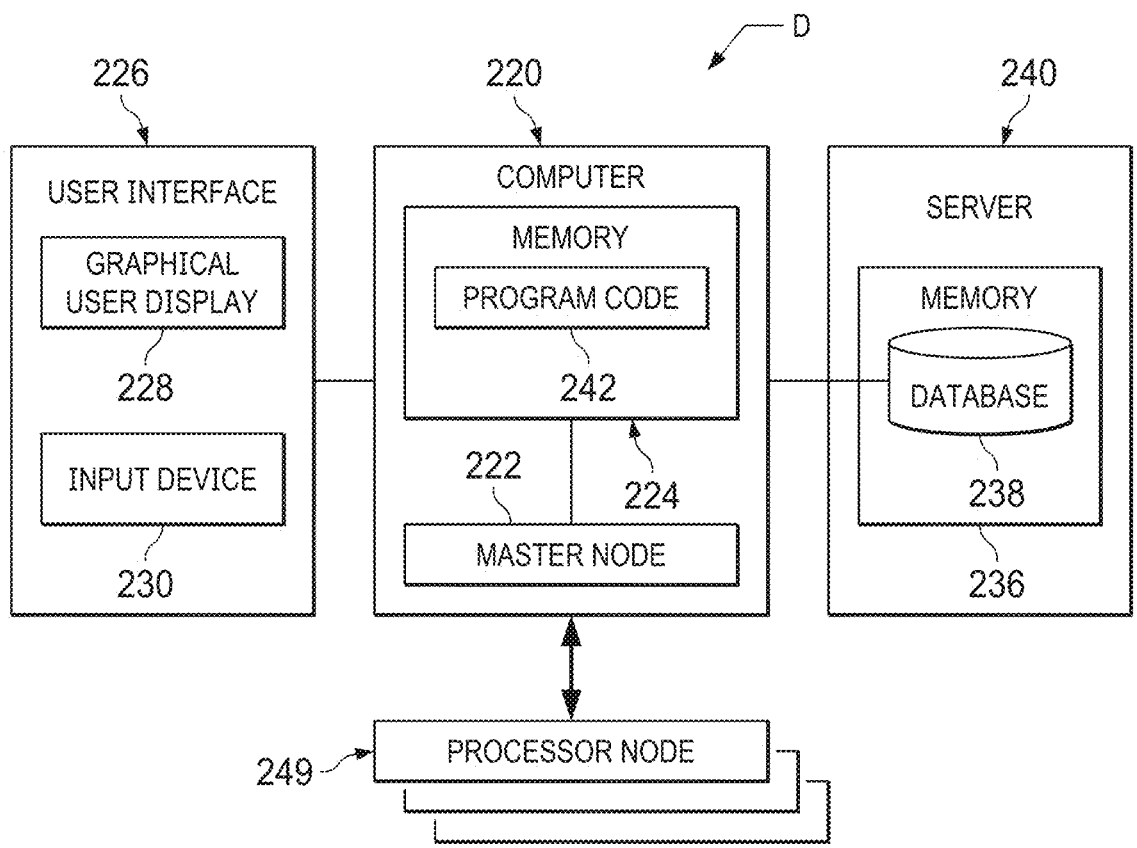
FIG. 20 is a schematic block diagram of a data processing system for determination of calibrated minimum horizontal stress magnitude using fracture closure pressure and multiple mechanical earth model realizations according to the present invention.

As illustrated in FIG. 20, the data processing system D includes a computer 220 having a master node processor 222 and memory 224 coupled to the processor 222 to store operating instructions, control information and database records therein. The data processing system D is preferably a multicore processor with nodes such as those from Intel Corporation or Advanced Micro Devices (AMD), or an HPC Linux cluster computer. The data processing system D may also be a mainframe computer of any conventional type of suitable processing capacity such as those available from International Business Machines (IBM) of Armonk, N.Y. or other source. The data processing system D may in cases also be a computer of any conventional type of suitable processing capacity, such as a personal computer, laptop computer, or any other suitable processing apparatus. It should thus be understood that a number of commercially available data processing systems and types of computers may be used for this purpose.

The computer 220 is accessible to operators or users through user interface 226 and are available for displaying output data or records of processing results obtained according to the present invention with an output graphic user display 228. The output display 228 includes components such as a printer and an output display screen capable of providing printed output information or visible displays in the form of graphs, data sheets, graphical images, data plots and the like as output records or images.

The user interface 226 of computer 220 also includes a suitable user input device or input/output control unit 230 to provide a user access to control or access information and database records and operate the computer 220. Data processing system D further includes a database of data stored in computer memory, which may be internal memory 224, or an external, networked, or non-networked memory as indicated at 236 in an associated database 238 in a server 240.

The data processing system D includes program code 242 stored in non-transitory memory 224 of the computer 220. The program code 242 according to the present invention is in the form of computer operable instructions causing the data processor 222 to determine calibrated minimum horizontal stress magnitude using fracture closure pressure and multiple mechanical earth model realizations according to the present invention in the manner set forth.

It should be noted that program code 242 may be in the form of microcode, programs, routines, or symbolic computer operable languages capable of providing a specific set of ordered operations controlling the functioning of the data processing system D and direct its operation. The instructions of program code 242 may be stored in memory 224 of the data processing system D, or on computer diskette, magnetic tape, conventional hard disk drive, electronic read-only memory, optical storage device, or other appropriate data storage device having a computer usable non-transitory medium stored thereon. Program code 242 may also be contained on a data storage device such as server 220 as a non-transitory computer readable medium, as shown.

The data processing system D may be comprised of a single CPU, or a computer cluster as shown in FIG. 20, including computer memory and other hardware to make it possible to manipulate data and obtain output data from input data. A cluster is a collection of computers, referred to as nodes, connected via a network. Usually a cluster has one or two head nodes or master nodes 222 used to synchronize the activities of the other nodes, referred to as processing nodes 244. The processing nodes 244 each execute the same computer program and work independently on different segments of the grid which represents the reservoir.

Reservoir engineers have been able to develop multiple models of stress conditions in subsurface formations near wellbores in characterizing the nature of a subsurface as suitable for hydrocarbon production well operations. Example types of well operations included drilling a multilateral well based on the results of the characterization, and fracturing the formation at an appropriate location indicated by the results of the characterization. Each of these models represented a possible indication of stress conditions of interest. However, the accuracy of the stress conditions indicated in the model was dependent on the accuracy of the estimates of rock mechanical properties and stress regimes provided as input data. So far as is known, there was no way to confirm a particular estimate of rock mechanical properties and stress regime in a subsurface formation was more reliable or accurate than other such estimates.

The present invention is integrated into a practical application in that it solves a technological problem by determination of calibrated minimum horizontal stress magnitude using fracture closure pressure and multiple mechanical earth model realizations.

The present invention differs from previously used methods in that predicted reservoir stress from models for a number of realizations of reservoir conditions are compared with actual fracture closure data from reservoir pressure tests. An error function representing results of the comparisons is formed and an optimization performed. The optimization indicates which realization of reservoir conditions for the formation rock provides a predicted reservoir stress which is suitably accurate in view of formation stresses obtained from actual pressure tests of the formations.

The invention has been sufficiently described so that a person with average knowledge in the field of geomechanical modeling of stress conditions in subsurface formations may reproduce and obtain the results mentioned in the invention herein. Nonetheless, any skilled person in the field of technique, subject of the invention herein, may carry out modifications not described in the request herein, to apply these modifications to a determined structure and methodology, or in the use and practice thereof, requires the claimed matter in the following claims; such structures and processes shall be covered within the scope of the invention.

It should be noted and understood that there are improvements and modifications made of the present invention described in detail above without departing from the spirit or scope of the invention as set forth in the accompanying claims.

What is claimed is:

1. A method of obtaining a calibrated measure of minimum horizontal stress magnitude in a subsurface geological structure at a location of a well in a subsurface hydrocarbon reservoir adjacent a well borehole wall in the subsurface structure, for characterizing the nature of the reservoir in a three dimensional grid cell model of the reservoir as suitable for hydrocarbon production, comprising the steps of:

obtaining reservoir parameters representing properties of the subsurface reservoir for processing in a data processing system;

forming a plurality of different sets of estimated measures of tensor stresses in the grid cells of the grid cell model of the subsurface geological structure based on properties of the subsurface reservoir represented by the obtained parameters;

conducting well operations in the well to obtain measures of fracture closing pressure adjacent the borehole wall in the grid cells of the grid cell model;

forming a an error function comprising set of a plurality of error measures indicating the difference differences of the plurality of different sets of estimated measures of tensor stresses in the grid cells from the obtained measures of fracture closing pressure adjacent the borehole wall in the grid cells of the grid cell model; and performing an optimization of the measures of tensor stresses in the grid cells of the grid cell model adjacent the borehole wall is within acceptable limits of accuracy of the fracture closing pressure.

2. The method of claim 1, further including the step of:
drilling a multilateral well from the location of the well based on optimization of the measures of tensor stresses in the grid cell model adjacent the borehole wall.

3. The method of claim 1, wherein the well operations conducted to obtain measures of fracture closing pressures comprise leak-off tests.

4. The method of claim 1, wherein the well operations conducted to obtain measures of fracture closing pressures comprise extended leak-off tests.

5. The method of claim 1, wherein the well operations conducted to obtain measures of fracture closing pressures comprise hydraulic fracture tests.

6. The method of claim 1, wherein the reservoir parameters representing properties of the subsurface reservoir comprise well drilling data.

7. The method of claim 1, wherein the reservoir parameters representing properties of the subsurface reservoir comprise well completion data.

8. The method of claim 1, wherein the reservoir parameters representing properties of the subsurface reservoir comprise petrophysical properties of the subsurface geological structure.

9. The method of claim 1, wherein the reservoir parameters representing properties of the subsurface reservoir comprise dynamic mechanical properties of the rock in the subsurface geological structure.

10. The method of claim 1, wherein the reservoir parameters representing properties of the subsurface reservoir comprise static mechanical properties of the rock in the subsurface geological structure.

11. A method of obtaining a calibrated measure of minimum horizontal stress magnitude in a subsurface geological structure at a location in a subsurface hydrocarbon reservoir adjacent a well borehole wall in a three dimensional grid cell model of the reservoir for characterizing the nature of the reservoir as suitable for fracturing to produce hydrocarbon fluids from the subsurface geological structure, comprising the steps of:
obtaining reservoir parameters representing properties of the subsurface reservoir for processing in a data processing system;
forming a plurality of different sets of estimated measures of tensor stresses in the grid cells of the grid cell model of the subsurface geological structure based on properties of the subsurface reservoir represented by the obtained parameters;
conducting well operations in the well to obtain measures of fracture closing pressure adjacent the borehole wall in the grid cells of the grid cell model;
forming a an error function comprising a set of a plurality of differences of the plurality of different sets of estimated measures of tensor stresses in the grid cells from the obtained measures of fracture closing pressure adjacent the borehole wall in the grid cells of the grid cell model; and
performing an optimization of the measures of tensor stresses in the grid cells of the grid cell model adjacent the borehole wall is within acceptable limits of accuracy of the fracture closing pressure.

12. The method of claim 11, further including the step of:
fracturing the subsurface geological structure at the location of the well to produce hydrocarbon fluids based on optimization of the measures of tensor stresses in the grid cell model adjacent the borehole wall.

13. The method of claim 11, wherein the well operations conducted to obtain measures of fracture closing pressures comprise leak-off tests.

14. The method of claim 11, wherein the well operations conducted to obtain measures of fracture closing pressures comprise extended leak-off tests.

15. The method of claim 11, wherein the well operations conducted to obtain measures of fracture closing pressures comprise hydraulic fracture tests.

16. The method of claim 11, wherein the reservoir parameters representing properties of the subsurface reservoir comprise well drilling data.

17. The method of claim 11, wherein the reservoir parameters representing properties of the subsurface reservoir comprise well completion data.

18. The method of claim 11, wherein the reservoir parameters representing properties of the subsurface reservoir comprise petrophysical properties of the subsurface geological structure.

19. The method of claim 11, wherein the reservoir parameters representing properties of the subsurface reservoir comprise dynamic mechanical properties of the rock in the subsurface geological structure.

20. The method of claim 11, wherein the reservoir parameters representing properties of the subsurface reservoir comprise static mechanical properties of the rock in the subsurface geological structure.

* * * * *